United States Patent
Wu et al.

(10) Patent No.: US 7,321,384 B1
(45) Date of Patent: Jan. 22, 2008

(54) METHOD AND APPARATUS FOR USING FAR END CAMERA CONTROL (FECC) MESSAGES TO IMPLEMENT PARTICIPANT AND LAYOUT SELECTION IN A MULTIPOINT VIDEOCONFERENCE

(75) Inventors: Duanpei Wu, San Jose, CA (US); Nermin M. Ismail, Mountain View, CA (US); Shantanu Sarkar, San Jose, CA (US); Walter R. Friedrich, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 1119 days.

(21) Appl. No.: 10/453,341

(22) Filed: Jun. 3, 2003

(51) Int. Cl.
*H04N 7/14* (2006.01)
(52) U.S. Cl. .................. 348/14.08; 348/14.1; 370/401
(58) Field of Classification Search ............. 348/14.08
See application file for complete search history.

(56) References Cited

U.S. PATENT DOCUMENTS

| | | | |
|---|---|---|---|
| 6,025,870 A * | 2/2000 | Hardy | 348/14.1 |
| 6,297,846 B1 * | 10/2001 | Edanami | 348/239 |
| 2003/0174202 A1 * | 9/2003 | Eshkoli et al. | 348/14.08 |

OTHER PUBLICATIONS

*PowerPlay IP Contact User's Guide.* Vers. 6.0. 1999-2001. Numerex Corp., Atlanta, GA.
*MCU / Multipoint Bridging.* 2003. RADVISION Corp. Website., RADVISION Corp., Glen Rock, NJ. May 16, 2003. URL: <http://www.radvision.com/NBU/Products/viaIP+Custom+Solutions/MCU.htm?IsPrint=yes>.
*viaIP MCU Datasheet.* 2002. RADVISION Corp. Website. RADVISION Corp., Glen Rock, NJ. URL: <http://www.radvision.com/NR/rdonlyres/AFA62E3E-9ADD-4702-BE01-DE4C44E19D4D/468/viaIPMCU1.pdf>.
*IP Centric Conferencing; A RADVISION White Paper.* 2001. RADVISION Corp. Website. RADVISION Corp., Glen Rock, NJ. URL: <http://www.radvision.com/NR/rdonlyres/162F9E89-5DB2-4F74-9A08-06E79B24944D/344/RADVISIONIPCentric-Conferencing.pdf>.
*The H.323 Revolution; A Technology Review.* 2002. RADVISION Corp. Website. RADVISION Corp., Glen Rock, NJ. URL: <http://www.radvision.com/NR/rdonlyres/162F9E89-5DB2-4F74-9A08-06E79B24944D/342/RADVISIONH323Revolution.pdf>.

(Continued)

*Primary Examiner*—Creighton Smith
(74) *Attorney, Agent, or Firm*—Dov Rosenfeld; Inventek

(57) ABSTRACT

A method and an apparatus for providing layout selection, participant selection, and/or participant-to-participant far end camera control of the selected participant for use in a continuous presence multipoint videoconference. The method includes receiving an FECC message of a set of FECC messages over a packet network from a first participant, the first participant having a set of FEEC modes and being in one of the FECC modes. The method further includes maintaining knowledge of the mode of the first participant and interpreting the received FECC message according to the FECC mode of the first participant. Depending on the FECC mode of the first participant, the interpreted FECC message, and the set of controls provided by the method (layout selection and/or participant selection to select a participant and/or participant-to-participant camera control), the method further includes one of changing the FECC mode of the first participant, forming a layout for the first participant, selecting a participant for the first participant, or carrying out participant-to-participant camera control of a previously selected participant.

47 Claims, 14 Drawing Sheets

OTHER PUBLICATIONS

*Polycom ViewStation FX Product Datasheet*. Rev. Apr. 2002. 2002. Polycom Corp. Website. Polycom Corp., Milpitas, CA. URL: <http://www.polycom.com/common/pw_item_show_doc/0,1449,823,00.pdf>.

*Polycom iPower Executive Desktop Product Datasheet*. 2002. Polycom Corp. Website. Polycom Corp., Milpitas, CA. URL: <http://www.polycom.com/common/pw_item_show_doc/0,1449,1029,00.pdf>.

*VCON Falcon Product Datasheet*. Rev. 6 Feb. 2003. 2002. VCON Corp Website. VCON Corp. U.S., Austin, TX. URL: <http://www.vcon.com/pdfdoc/eng/ds/030910_Flcn_DS_Eng.pdf>.

*VCON MediaConnect 9000 Product Datasheet*. Rev. 4 Feb. 2003. 2002. VCON Corp. Website. VCON Corp. U.S., Austin, TX. URL: <http://www.vcon.com/pdfdoc/eng/ds/030910_MC9000_DS_Eng.pdf>.

*TANDBERG 550 Product Datasheet*. Jul. 2002. TANDBERG Corp. Website. TANDBERG Corp. U.S., Dallas, TX. URL: <http://www.ivci.com/pdf/tandberg_550_data_sheet.pdf>.

* cited by examiner

METHOD AND APPARATUS FOR USING FAR END CAMERA CONTROL (FECC) MESSAGES TO IMPLEMENT PARTICIPANT AND LAYOUT SELECTION IN A MULTIPOINT VIDEOCONFERENCE

BACKGROUND

This invention is related to multimedia communications systems, and in particular to a method and apparatus for using Far End Camera Control (FECC) messages to implement participant selection, layout selection, and/or participant-to-participant camera control in a multipoint videoconference, e.g., over a packet network, such as a network using IP.

Multimedia multipoint conferences that include audio and video, commonly called multimedia teleconferences and videoconferences, are becoming more and more widespread. A multipoint videoconference allows three or more participants at a plurality of locations to establish bi-directional multimedia communication including audio and video, while sharing the audio-visual environment, in order to give the impression that the participants are all at the same place.

Packet networks, in particular IP-based packet networks are increasingly popular for multimedia conferences. Recommendation H.323 titled "Packet-based multimedia communications systems" (International Telecommunication Union, Geneva, Switzerland) describes the technical requirements for multimedia communications services in a packet-switched network. The packet-switched networks may include local area networks (LANs), wide area networks (WANs), public networks and internetworks such as the Internet, point-to-point dial up connections over PPP, or using some other packet-switched protocol. The invention is described herein using International Telecommunication Union (ITU, ITU-T) Recommendation H.323. The invention, however, is not limited to H.323.

In a multipoint videoconference, a generally desirable feature is the ability to simultaneously view more than one site other than the viewer's site, optionally including the viewer's site. This feature is referred to herein as video mixing without regard to how many sites are visible at a time. A continuous presence videoconference is one that includes mixing, i.e., one in which the user has the capability to simultaneously view more than one site other than the viewer's site on a terminal's display.

In a continuous presence videoconference with video mixing, it is desirable for individuals at the participating terminals to be able to control the layout of their displays, and to select the other participant or participants being communicated with, e.g., for display or other purpose from the set of active participants. It also is desirable for a participant to be able to control the video camera of a selected participant e.g., at a remote site, or e.g., at the local site so that the participant can have control of the view. This ability is called Far End Camera Control (FECC). Typical controls include pan, tilt, and zoom controls, e.g., "pan-right", "pan-left", "tilt-up", "tilt-down", "zoom-in," and "zoom-out. It further is desirable for the participant to select which camera, e.g., which participant's camera is being controlled.

By layout control, we mean the selection by a particular participant of the manner of switching, i.e., how many participants are being displayed and the layout on the particular participant's video screen. By participant selection, we mean the selection by a particular participant of one of the videoconference participants. The participant selection may be in order to select a layout feature for the selected participant such as full screen or an enlarged view for the selected participant. The participant selection may also be for participant-to-participant camera control in order to control the camera at the site of the selected participant.

Extensions to participant-to-participant camera control also are known. For example, there may be some extensions Annex Q of H.323 that may be supported by one terminal but not by another. For example, suppose terminal A has a microphone in the camera and this capability can be signaled and controlled using Annex Q version 2 which both terminal A and the MCU support. Consider a videoconference with terminals A, B, and C centrally controlled over a packet network. Suppose terminal B does not support the extensions to Annex Q of H.323 that permit the microphone of a camera to be controlled. There is a need in the art for a mechanism that provides for a terminal of a multipoint conference to control the microphone, e.g., to mute the microphone of another participant of the multipoint conference.

In this description, we include extended camera control such as controlling, e.g., muting, the microphone of another participant in the term "participant-to-participant camera control."

Limited participant and layout selection is known for prior art multipoint videoconferences over ISDN networks. ITU-T Recommendation H.320 titled "Narrow-band visual telephone systems and terminal equipment" is known for ISDN videoconferences, including multipoint videoconferences. ITU-T Recommendation H.243 for use in H.320 systems defines procedures commonly known as "Chair Control" that allow one person in a multipoint videoconference to control who is being shown at the other participants' displays and to select one of a few available layouts for display. Thus, H.320 provides some limited means of participant and layout selection for a multipoint videoconference. However, in the case of packet networks, typical videoconference terminals, e.g., for videoconferences conforming to H.323, are not conference aware. That is, the terminal is not aware that it is in communication with an MCU rather than with another terminal. Thus, there is no standard way to address the other conference participants. Furthermore, there is no standard way to carry out participant selection.

Note that H.323 uses ITU recommendation H.245 titled "Control Protocol for multimedia communication" for control messaging, and H.245 does provide a mechanism for a terminal that is conference aware to obtain, e.g., from an MCU a list of terminals labels that the terminal can currently see. Using such information, it is conceivable that terminal can allow the user to select the participant's whose camera it wants to control. However, most commonly used terminals today do not implement this part of H.245 as they are not conferencing aware. For such devices, communicating with an MCU is the same as communicating with another endpoint. Thus there still is a need for a methods for participant selection, and for participant-to-participant camera control that do not require end devices to be aware that they are communicating with an MCU rather than with another terminal.

Far end camera control is suggested for packet network-based multipoint videoconferences, but not in a standard way. For example, Annex Q of ITU-H.323 titled "Far-end camera control and H.281/H.224" defines a protocol H.281/H.224 based Far End Camera Control (FECC) applicable to packet-based networks. ITU Recommendation H.281 Defines FECC using protocols that conform to ITU Recommendation H.224. ITU Recommendation H.224 titled "Real Time Control protocol for simplex applications using the H.332 LSD/HSD/MLP channels" provides a simple yet flexible protocol for simplex, low delay applications. Using these protocols, FECC is available in packet networks for endpoint-to-endpoint communication. However, as discussed above, there is no standard way to address individual endpoints for participant-to-participant camera control—or extended control, e.g., of a microphone—in a packet-based H.323 multipoint videoconference of terminals that are not conference aware.

Thus there is a need in the art for participant selection in a multipoint videoconference on a packet-based network. Thus there also is a need in the art for layout selection in a multipoint videoconference on a packet-based network. Thus there also is a need in the art for participant-to-participant camera control by a local participant for a selected remote participant in a multipoint videoconference on a packet-based network.

In particular, there is a need to provide one or more of these capabilities on-the-fly during a videoconference, i.e., in a continuous presence mode.

Prior art mechanisms are available that provide some form of participant selection and/or layout selection and/or participant-to-participant camera control of a remote participant in a packet network-based multipoint videoconference.

One prior-art method is to multicast the videoconference. Multicasting differs from a centralized configuration via a Multipoint Control Unit (MCU) in which all participants of the videoconference establish communication with the MCU and communicate with other participants via the MCU. In a centralized configuration, the MCU ensures that multipoint videoconference connections are properly set up and released, that audio and video streams are properly switched and/or mixed, and that the data are properly distributed among the videoconference participants. An alternate to using an MCU is to have a distributed configuration that includes multicasting the videoconference. That is, each and every participant sends messages to all other participants. Some form of participant selection and/or layout selection and/or participant-to-participant camera control of a remote participant is available in such a non-centrally controlled videoconference. However, to use such mechanisms the end device has to be conference-aware.

Another prior-art mechanism for providing some form of participant selection and/or layout selection and/or participant-to-participant camera control in a packet network-based videoconference uses a Web-based service. RADVISION Ltd., Tel-Aviv, Israel, for example, has an MCU product that includes Web-based monitoring and control for configuration and setup from any location using a web browser. The RADVISION web interface provides real-time videoconference control capabilities and three types of user access (administrator, videoconference manager and user). Continuous presence mode enables an enhanced and simultaneous view of videoconference participants with a choice of different layouts, e.g., 16, 1+12, 2+8, 3+4, 4 or 1. Using the Web-based interface, the videoconference manager in a RADVISION based multipoint videoconference can dynamically change the video layout during a videoconference call with dynamic "On-the-Fly" layout control.

However, there is no standard mechanism in the prior art that provides these services with standard videoconference terminals in a centrally controlled, e.g., MCU-based, videoconference over a packet-based network, e.g., an IP-based network.

SUMMARY

Embodiments of the present invention provide mechanisms for participant selection, layout selection and/or participant-to-participant camera control of a selected participant's camera or microphone in a centrally controlled multipoint videoconference over a packet-based network, e.g., an IP network. One embodiment uses the FECC mechanisms defined in Annex Q of H.323 to carry out continuous presence layout selection and/or participants selection function, in addition to the ordinary pan, tilt and zoom FECC functions and extensions thereof, such as microphone control.

One embodiment provides selection of continuous presence layouts that can be carried out any time during the videoconference without resorting to a renegotiating process.

Described herein are a method and an apparatus for providing one or more controls of the set of controls consisting of layout selection, participant selection to select a participant, and participant-to-participant far end camera control of the selected participant. Thus, included in the scope of the invention are embodiments that provide all capabilities, embodiments that provide layout selection only, embodiments that provide participant selection only, embodiments that provide a combination of participant selection with participant-to-participant camera control, embodiments that provide extended participant-to-participant camera control, such as microphone control, and so forth. These capabilities are provided for use in a centrally controlled continuous presence multipoint videoconference. The capabilities are for the active participants, i.e., those participants that, in a centrally controlled videoconference, the MCU can communicate with, and in particular, can control what is sent to the video display of the participant. In an embodiment that includes layout selection and participant selection and participant-to-participant camera control, an operator of a particular terminal (a first terminal) can select a desired layout from a set of layouts to display in the local terminal and can also select one of the remote participants, e.g., from the selected layout. The selected participant can also be viewed full-screen on the first terminal. The operator of the first terminal can also conduct participant-to-participant camera control on the selected terminal. One embodiment uses only the basic features of terminal-to-terminal FECC including PAN LEFT, PAN RIGHT, TILT UP, TILT DOWN, ZOOM IN and ZOOM OUT.

In one embodiment, the method includes receiving an FECC message of a set of FECC messages over a packet network from a first participant, the first participant having a set of FECC modes and being in one of the FECC modes of the set. The method further includes saving the mode of the first participant and interpreting the received FECC message according to the FECC mode of the first participant. Depending on the FECC mode of the first participant, the interpreted FECC message, and the set of controls provided by the method (layout selection and/or participant selection to select a participant and/or participant-to-participant camera control), the method further includes one of changing the FECC mode of the first participant, forming a layout for the first participant, selecting a participant for the first participant, or carrying out camera control for a previously selected participant.

DETAILED DESCRIPTION

Figure 1:
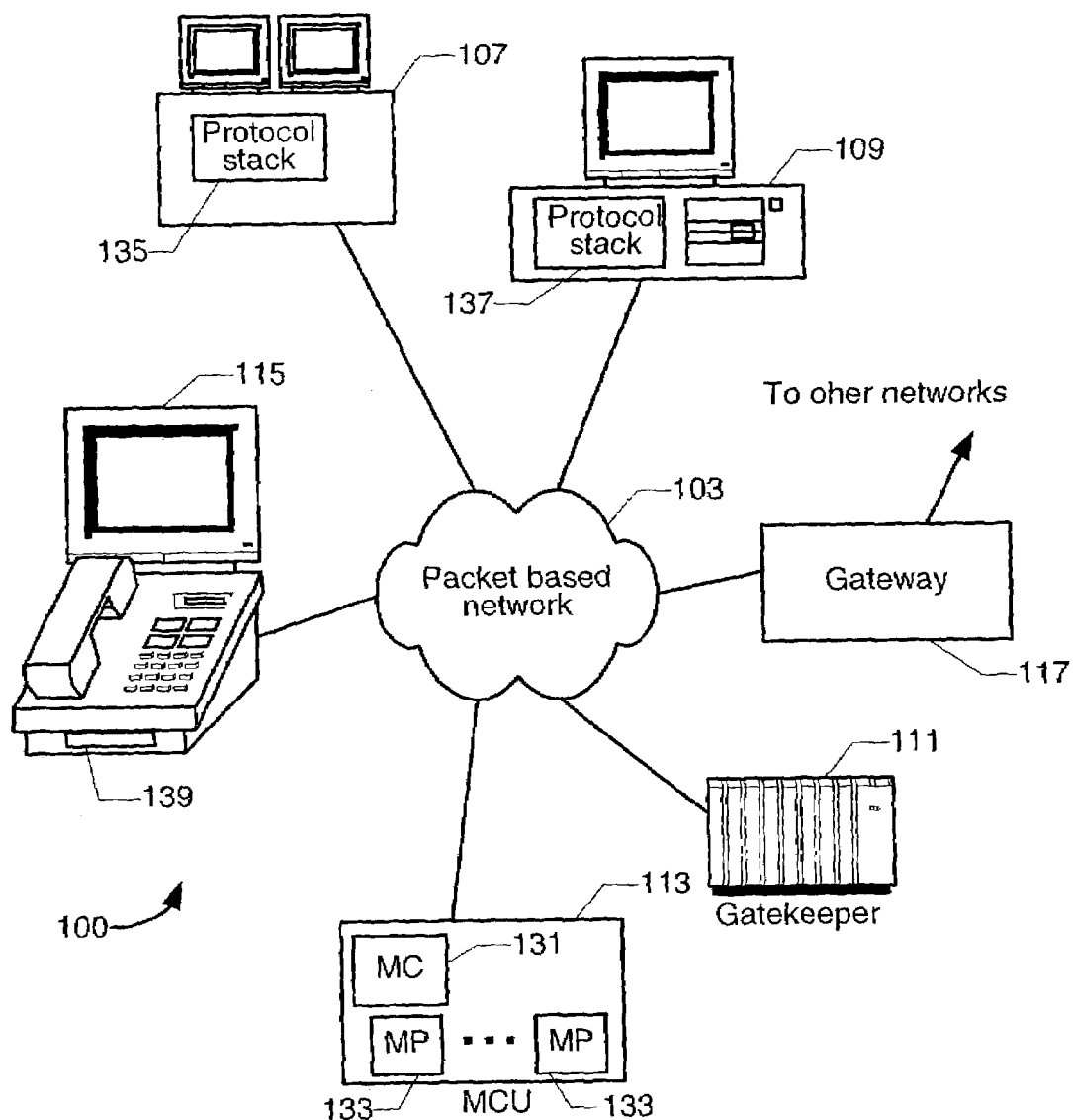
FIG. 1 shows a typical simple configuration of a multipoint videoconference on a packet-based network.

Embodiments of the present invention provide mechanisms for participant selection, layout selection and/or participant-to-participant camera control of a selected participant's camera in a centrally controlled multipoint videoconference over a packet-based network, e.g., an IP network. One embodiment uses the FECC mechanisms defined in Annex Q of H.323 to carry out continuous presence layout selection and/or participants selection and/or participant-to-participant camera control function, in addition to the ordinary pan, tilt and zoom FECC functions. The invention, however, does not depend on using H.323 or any other specific protocol. The only requirement is that basic point-to-point FECC features are supported The terminals furthermore do need to be conference aware, i.e., do not need know that they are in communication with an MCU rather than another terminal.

The H.323 Conforming Videoconference

Embodiments of the present invention operate in a videoconference that conforms to H.323. H.323 specifies four major components: Terminals, Gateways, Gatekeepers, and Multipoint Control Units (MCU). Terminals, Gateways, and MCUs are classified as Endpoints. Endpoints are devices that can initiate and receive calls. Other components associated with H.323 are the codecs used to encode, i.e., compress and decode, i.e., decompress audio and video transmissions.

H.323 specifies a call setup process that includes negotiating the capabilities of the participants, including for example which codec(s) will be used by each participant.

Terminals are client endpoints that provide real-time, two-way communications. For the purpose of this invention, a terminal provides videoconferencing and in some embodiment, data conferencing. Videoconferencing typically but not necessarily includes audio. A terminal may be a stand-alone device, or implemented in software—including a "H.323 stack"—running on a computer such as a personal computer (PC). Stand-alone devices include video telephones and Internet telephones. Today, many terminals are PCs running terminal software programs that include a H.323 stack. Other terminals may be videophone units.

The term participant is often used synonymously with terminal herein.

A Multipoint Control Unit (MCU) is a H.323 device that provides services used for three or more terminals to participate in a multipoint videoconference. All terminals participating in the videoconference establish communication with the MCU. The MCU ensures that multipoint videoconference connections are properly set up and released, that audio and video streams are properly switched and/or mixed, and that the data are properly distributed among the videoconference participants. By using a central multipoint topology, each terminal at a different location sends its data to a MCU. The MCU negotiates between terminals for the purpose of determining which codec the MCU needs to use, and then may handle the media stream. After processing all the data, MCU sends back the mixed and switched data to each participant.

Embodiments of the present invention are implemented in an MCU.

The function(s) of a MCU may be handled by a central videoconference server (centralized MCU), or alternately by a network of videoconference servers that operate co-operatively to act like one central videoconference server (distributed MCU). The MCU functions may be integrated in other H.323 components.

In one embodiment, an MCU includes a Multipoint Controller (MC) and optionally one or more Multipoint Processors (MP). An MC takes care of the required call set up messages and the required messages that are used to set up the terminal media capability and to negotiate the functions for audio and video processing. Such messages and negotiations conform to H.245 (ITU-T Recommendation H.245 titled "Control Protocol for multimedia communication"). The MP(s) when present in the MCU each switches, mixes, and translates video, audio, and data streams. Thus, each MP in a MCU receives media streams from one or more videoconference participants, and processes and distributes the media streams to the terminals in a videoconference. The MC controls resources by determining what data flows are to be transmitted by the MP(s) in the MCU.

The one or more MPs of an MCU each handles the required video and audio mixing and switching. The mixing typically requires transcoding. Transcoding typically includes decoding all the incoming video signals for every video conferencing terminals, scaling the signals for all other terminals, reformatting the signals for all the terminals, and organizing each of the image and mixing them into a designated position, then re-encoding the mixed audio and video signals and sending the encoded audio and video streams to each of the terminals in communication with the MCU.

FIG. 1 shows a typical example of a configuration using multimedia conferencing equipment. The multimedia conferencing equipment shown can be configured to set up a multipoint videoconference that includes a H.323 conforming part 100 of the multipoint videoconference. There also may be other parts of the videoconference such as a H.320 conforming part (not shown) on a switched network (not shown) that is coupled to the H.323 conforming part 100 via a gateway 117. The H.323 part 100 uses a packet network 103 that in one embodiment uses IP packets. Network 103 may be a LAN, a WAN, or an internetwork, e.g., the public Internet. The H.323 part 100 includes a terminal 107, an interactive video group terminal that includes a H.323 protocol stack 135 (including a codec) and a plurality of video screens. The H.323 part 100 also includes terminal 109, a PC-based desktop video conferencing terminal that includes a H.323 protocol stack 137 (including a codec) and a video display. The H.323 part 100 also includes terminal 115, a desktop videotelephone terminal that includes a H.323 protocol stack 139 (including a codec) and a video display. The terminals 107, 109, and 115 are each coupled to network 103 via respective network links, e.g., Ethernet links.

The H.323 part 100 shown in FIG. 1 also includes a gatekeeper 111 and a MCU 113 each coupled to network 103 via respective network links. The MCU includes an MC 131. A prior art MCU might also include one or more MPs 133. The terminals and the MCU communicate via network 103.

Figure 2:
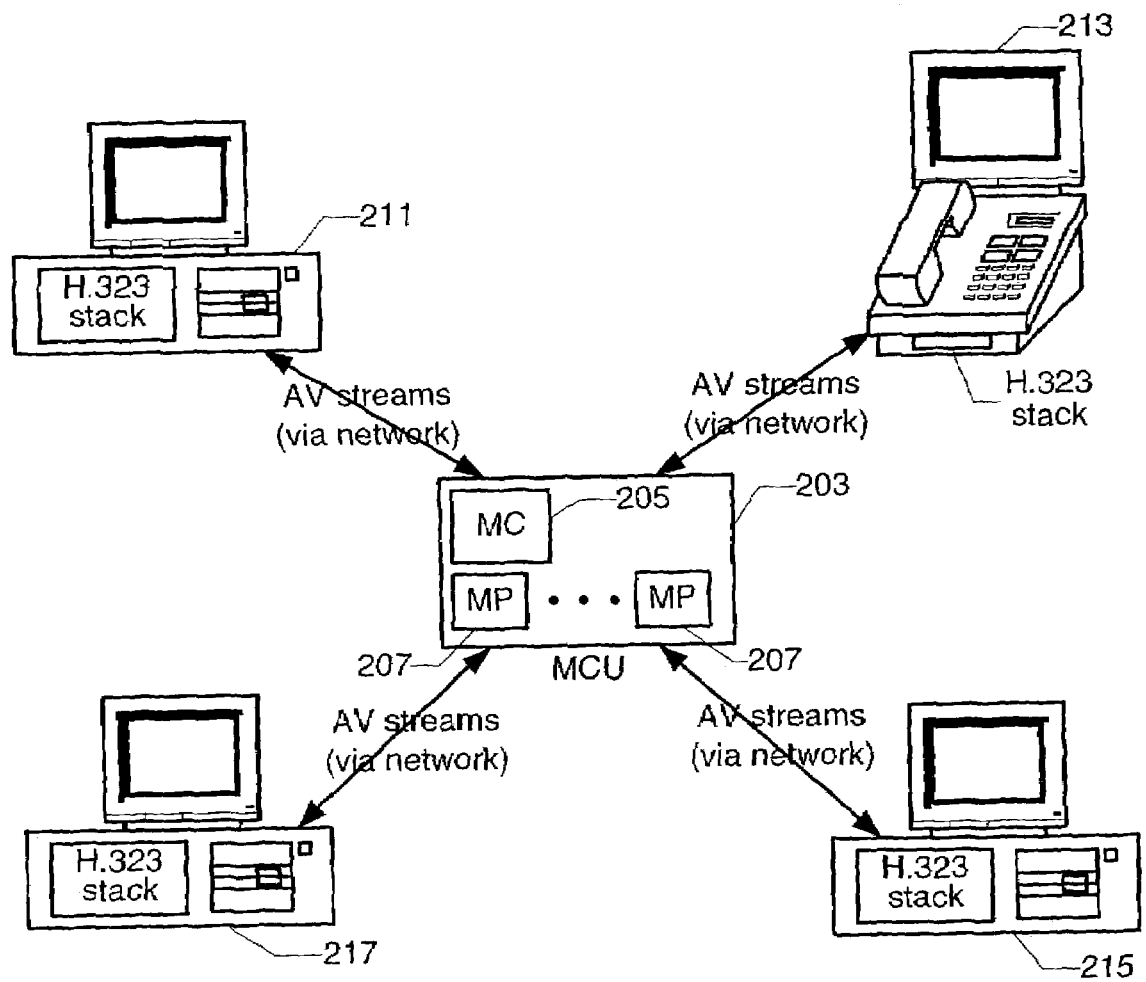
FIG. 2 shows the logical connection of an MCU and four terminals in a traditional centralized multipoint videoconference system.

FIG. 2 shows the logical connection of an MCU 203 and four terminals 211, 213, 215, and 217 in a traditional centralized multipoint videoconference system. Each of the logical connection is via a network such as network 103 (FIG. 1). MCU 203 includes MC 205 and a set of MPs 207. The terminals 211, 213, 215, and 217 participate in a multipoint videoconference by exchanging messages via MCU 203. Each of the terminals includes a protocol stack conforming to H.323. Many types of terminals are available, and in such terminals, one or more of the protocol stack components may be implemented by software, by hardware, or by a combination of software and hardware.

While the arrangements of FIGS. 1 and 2 are each prior art, so are each labeled "prior art," an arrangement such as that of FIG. 1 or FIG. 2 with an MCU that includes one or more of the inventive aspects described herein is not prior art.

A call is set up by the terminals exchanging messages, e.g., via a gatekeeper if present, and via the MCU. The process starts with call signalling according to H.225 (ITU-T Recommendation H.225 titled "Call signalling protocols and media stream packetization for packet-based multimedia communication systems") to set up connections between the terminals. Once communication channels are set up, the terminals then exchange messages that according to H.323 conform to H.245. These messages are to exchange the capabilities of each of the participants in the multipoint videoconference, and are sent between the terminals via the MCU 203.

While in one embodiment, the communication between the MCU and the terminals uses IP and H.323 signals, in another embodiment, the control signals between the MCU and any terminal on the same local area network as the MCU are sent using a different protocol that is effective for the local area network. For example, in a system that conforms to the collection of products, designs, strategies, and protocols commonly called "Architecture for Voice, Video, and Integrated Data" or "AVVID" (Cisco Systems, Inc., San Jose, Calif.), if call control is restricted to the LAN environment, one embodiment uses a proprietary protocol for call control called Skinny Client Control Protocol ("SCCP," or simply "Skinny") (Cisco Systems, Inc., San Jose, Calif.). Alternate embodiments can use other protocols, e.g., the Session Initialization Protocol (SIP) defined by the Internet Engineering Task Force (IETF).

Figure 3A:
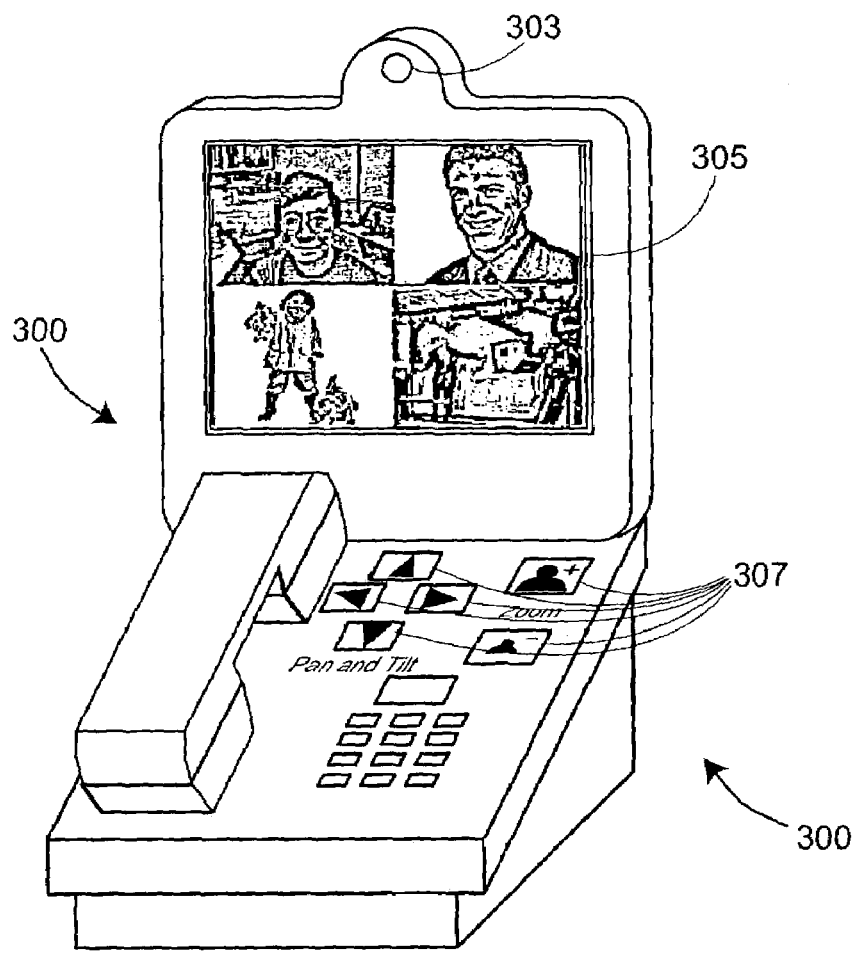
FIG. 3A shows in simplified form a videophone terminal that allows for continuous presence videoconferences, and that includes far end camera control (FECC).

FIG. 3A shows one example of a terminal, in this case a videophone 300, that includes controls 307 for far end camera control and that is capable of continuous presence multipoint videoconference when connected, e.g., via a packet network to an MCU that supports continuous presence multipoint videoconferences. The videophone 300 includes a video display 305, a video camera 303 and other features as would be known to those in the art. The videophone includes an interface to a packet network and a protocol stack conforming to H.323. Invoking the controls 307 for FECC, i.e., pressing the FECC buttons causes messages to be sent, e.g., that conform to Annex Q of H.323.

While a videophone such as videophone 300 is prior art, a videophone that operates according to one or more aspects of the present invention is not prior-art.

Figure 3B:
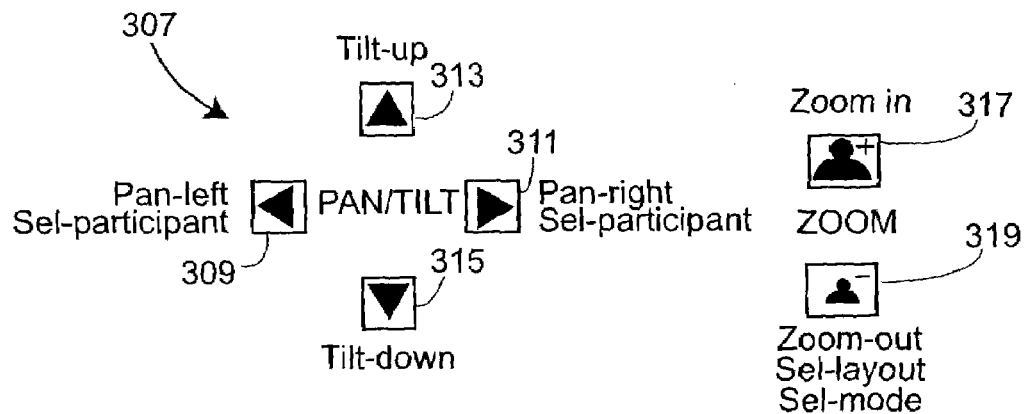
FIG. 3B shows buttons for far end camera control included in the videophone terminal shown in FIG. 3A.

FIG. 3B shows one embodiment of the controls for FECC. The annotation shown includes those features described further below in one embodiment that uses the FECC controls 307 for participant selection and/or layout selection. For example, in one embodiment, the zoom-out control is used for zoom out (when in participant-to-participant camera control mode), for layout selection when in layout selection mode, and to select the mode between the participant-to-participant camera control mode and the layout selection mode. As a further example and as described further below, the pan-right control is used to pan right when in participant-to-participant camera control mode, for participant selection when in participant selection mode, and to select the participant selection mode when in any mode other than participant-to-participant camera control. Details of one embodiment of such hierarchical control is described in more detail below.

Use of FECC for Layout Selection and/or Participant Selection

One embodiment of MCU 203 supports far end camera control (FECC) for all terminals that have this capability. One embodiment supports Annex Q of ITU Recommendation H.323, a standard protocol to conduct the FECC.

However, because not all terminals may support H323 Annex Q, one embodiment additionally supports common methods other than those of Annex Q. For example, terminals are known that support only ISDN-like H.224-based HDLC frames. Such terminals are made by Polycom Inc., Pleasanton, California, and TANDBERG of Lysaker (Oslo), Norway and New York, N.Y. Other terminals are known that support both H.323 Annex Q and HDLC frames. Apparatus and method embodiments of the invention support using both H.323 Annex Q techniques and HDLC frames. What capabilities a particular terminal has is part of the process of each terminal's capability negotiating with the MCU in a manner known to those in the art.

Thus, the MCU maintains knowledge of the FECC capabilities of each participant of the multipoint videoconference Consider a multipoint videoconference of a first participant and two or more other participants, in other words, a videoconference of at least three terminals including a first terminal coupled to an MCU. The first terminal is coupled to the MCU via a packet network. According to one embodiment, one of the participants e.g., the first participant has a set of FECC modes such that an FECC message from the first participant may be interpreted differently by the MCU receiving the FECC message depending on the mode of the first participant.

Figure 6:
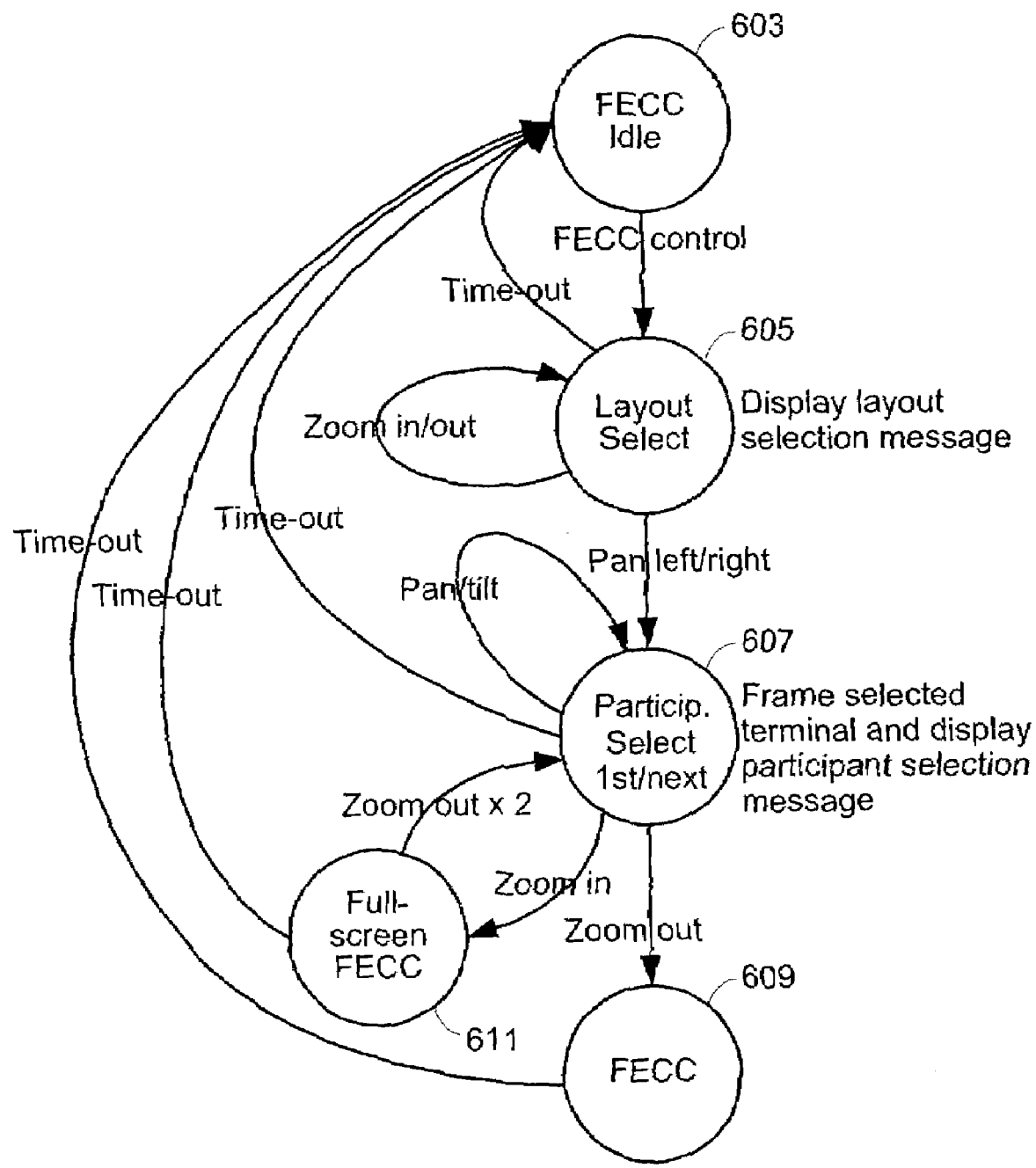
FIG. 6 shows a state transition diagram of the modes of a terminal requesting layout selection, participant selection, and/or participant-to-participant camera control, according to an embodiment of the invention.

A method embodiment of the invention is described with the aid of FIG. 6 that shows a state diagram for the different FECC modes of the first participant and for transitions between the FECC modes. The method embodiment providing one or more controls of the set of controls consisting of layout selection, participant selection to select a participant, and participant-to-participant far end camera control (FECC) of the selected participant. That is, for example, some versions provide only layout selection and far end camera control, while another version provides participant selection to select a participant, and participant-to-participant far end camera control (FECC) of the selected participant The MCU maintains knowledge of the mode of each of the participants, e.g., in a database of active participants. Thus, the method includes maintaining knowledge of the mode of the first participant.

One aspect of the invention is that an FECC message is interpreted differently by the MCU according to the FECC mode of the participant from which the MCU received the FECC message. Another aspect is that the participant does not need to be conference aware.

The operation of the method will be described with the aid of the state diagram of FIG. 6 and with FIGS. 7-13 that each show a pair of screen displays at the first participant before and after an FECC control is invoked at the first terminal. Note that the images in the screens shown in FIGS. 7-13 are rough two/tone (black/white) representations of video images.

Referring to FIG. 6, suppose the first participant has an initial mode 603 we call the FECC idle mode. In one embodiment, each participant returns to the idle mode after a period of time. When in the FECC idle mode, any FECC message from the first participant is interpreted by the MCU to change the mode of the first participant to a mode 605 (FIG. 6) called the layout selection mode that provides for changing the layout displayed at the screen of the first participant from a set of layouts. Thus, when the operator of the first terminal invokes any of the FECC controls provided at the first terminal, the FECC message related to the invoked control is sent to the MCU via the packet network, and the MCU interprets the received FECC message as an instruction to change the first participant's mode to layout selection mode. As a result, the MCU mixes according to a first layout from the set of layouts, and send the mixed video to the first participant to be displayed on the first participant's screen. In one embodiment, the MCU also includes a message for display on the first participant's screen to instruct the operator that the mode is layout selection mode, and for example, which FECC controls to invoke to change the layout or to change the mode.

Figure 14:
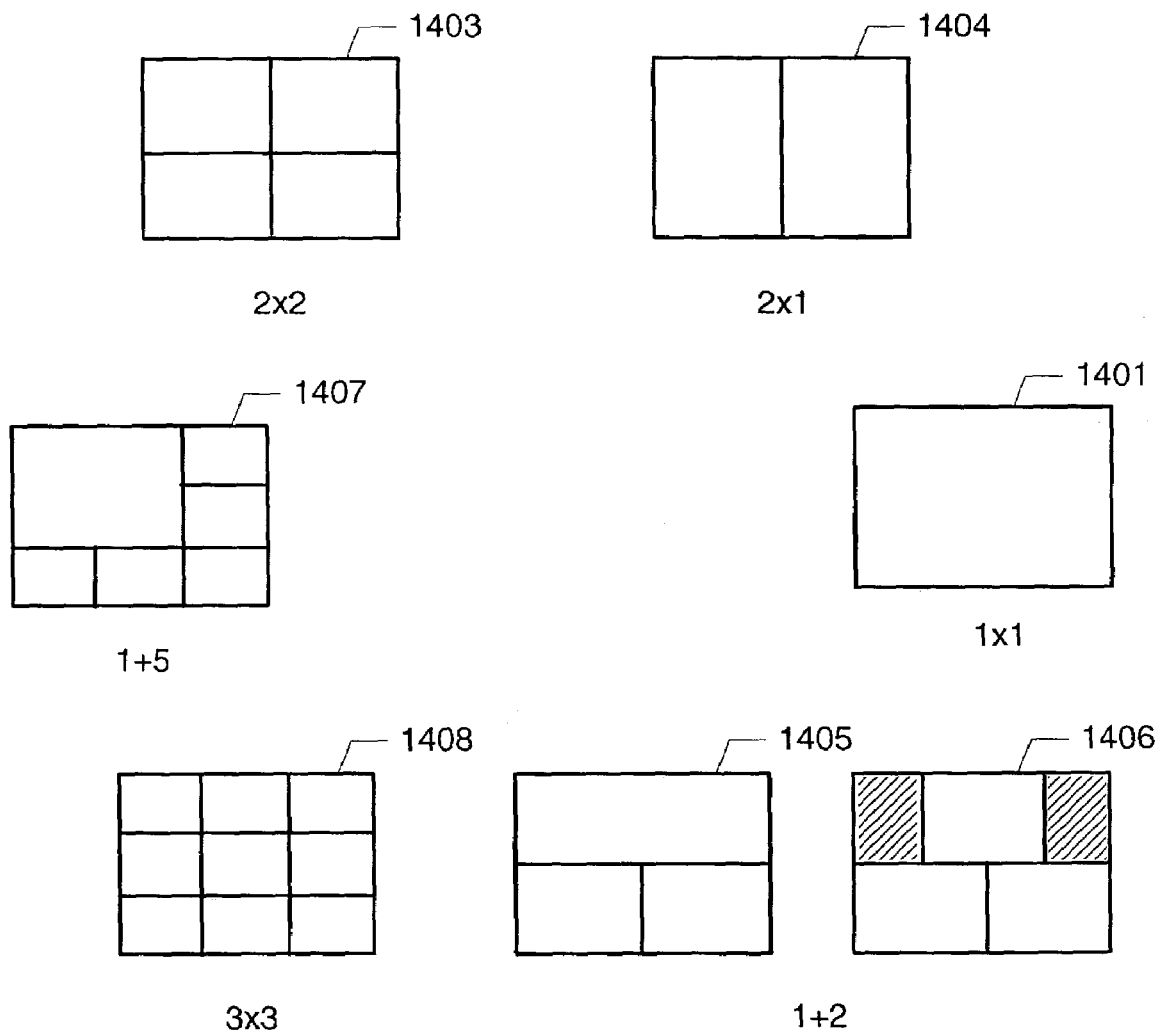
FIG. 14 shows the set of different layouts supported according to one aspect of the invention.

FIG. 14 shows the set of layouts supported by one embodiment of the invention. Layout 1403 (2×2) displays four participants on a 2 by 2 matrix. Layout. Layout 1404 (2×1) displays two participants side by side on the screen. Layout 1401 (1×1) displays one participant on the whole screen. Layouts 1405 and 1406 (each 1+2) each displays one participant and an additional two participants. Layout 1405 shows the one participant with full width, while layout 1406 has two blank bands on each side of the one participant. Versions include displaying the one participant more prominently than the two additional participants. Layout 1407 (1+5) displays one participant in relatively large size and five additional participants in small size. Layout 1408 (3×3) displays none participants as a 3 by 3 matrix. Other embodiments have fewer or more layouts in the set of layouts. Furthermore, not all terminals may be capable of all layouts.

Figure 7:
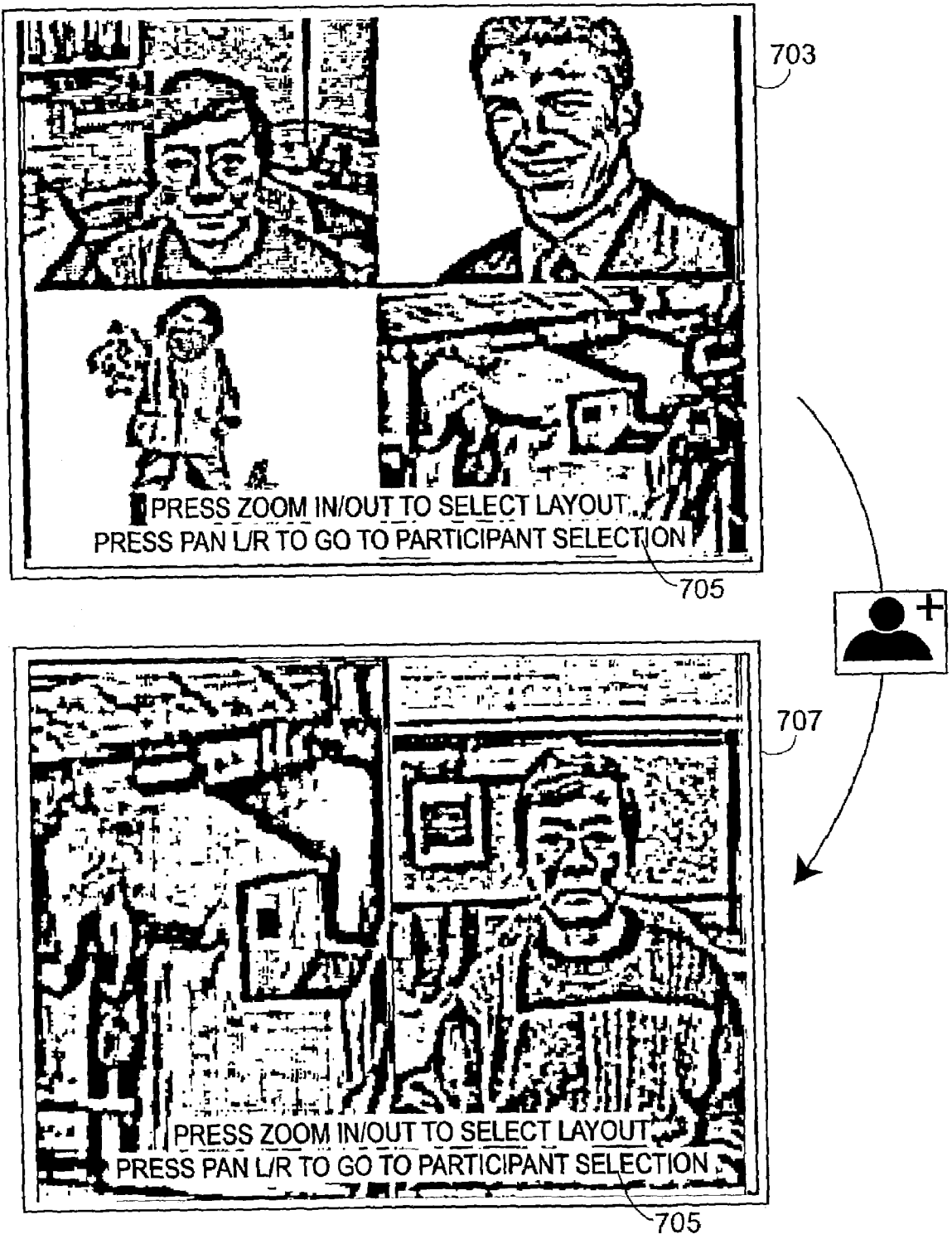
FIG. 7 shows two sample displays of a participant's screen while the participant is in layout selection mode before and after invoking of a layout selection control according to one aspect of the invention.

In one embodiment, the first layout depends on the number of participants. FIG. 7 shows an example 703 of the screen of the first participant in a 2×2 layout (the first layout) that includes a message 705 to instruct the viewer to press ZOOM IN or ZOOM OUT to select layout, or to press PAN LEFT or PAN RIGHT to go to a mode 607 we call the participant selection mode wherein FECC messages from the first participant are interpreted as commands for the MCU to select a participant for the first participant.

Figure 8:
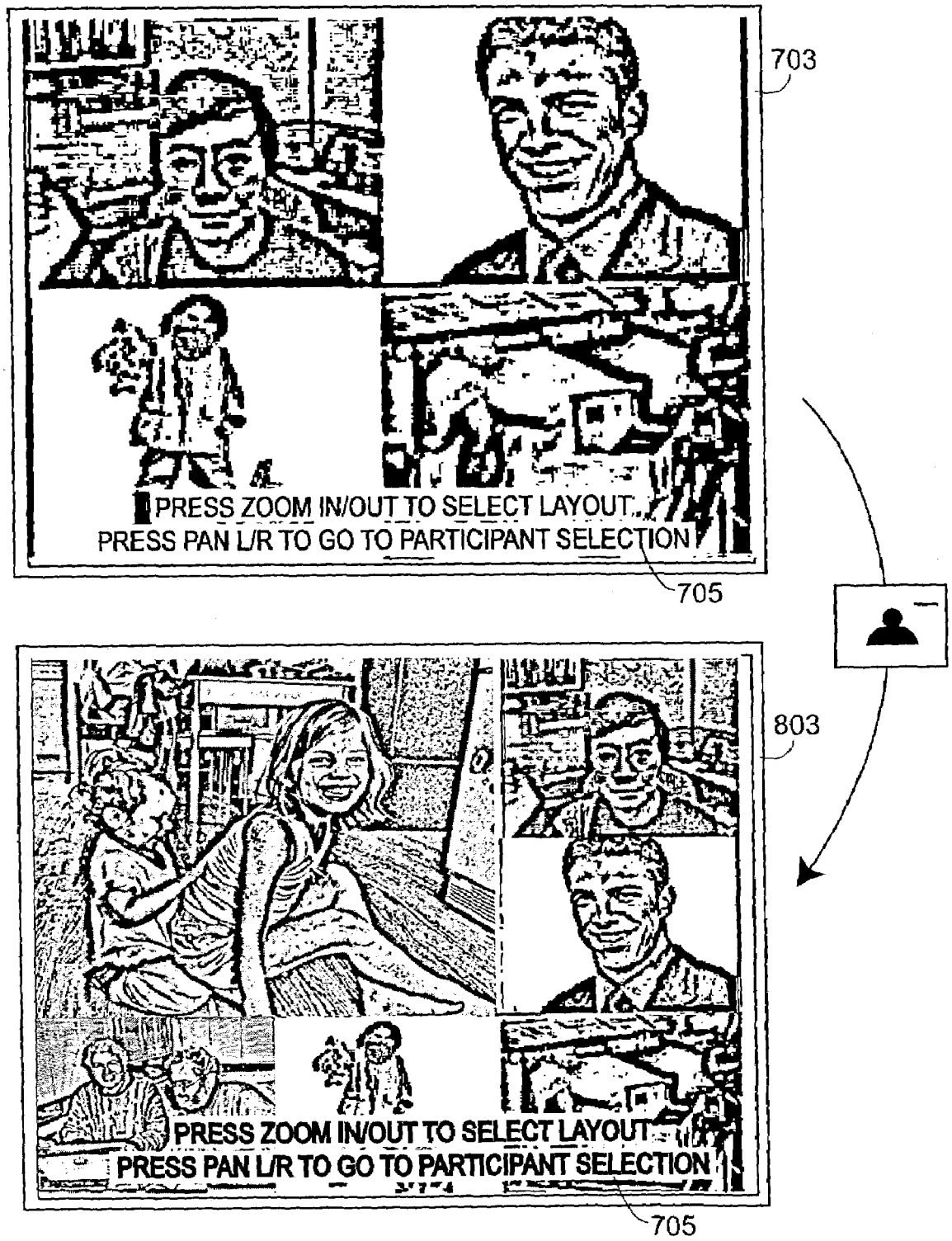
FIG. 8 shows two sample displays of a participant's screen while the participant is in layout selection mode before and after invoking of a layout selection control according to one aspect of the invention.

Each time one of the ZOOM controls is invoked by the first participant, the related FECC message is sent to the MCU. The MCU interprets the FECC message as an instruction to change the layout for the first participant. The change is according to some predefined order. For example, referring to FIG. 14, in one embodiment, the initial layout is a 2×2 layout 1403 and each successive ZOOM IN changed the layout from 1403 to 1404 to 1401 to 1405 to 1407 then back to 1403 if there are no more than 6 participants, or to layout 1409 then back to layout 1403 if there are more than 6 participants. Each successive ZOOM OUT changes the layout in the opposite direction, i.e., from layout 1403 to layout 1407 (no more than 6 participants), and so forth. Thus, FIG. 7 shows the results of the first participant pressing ZOOM IN. The MCU changes the layout to 2×1 layout 1404 shown as screen 707. FIG. 8 shows the results of pressing ZOOM OUT. Starting again from layout 703 and assuming there are a total of 6 participants, the MCU receives the ZOOM OUT message and, because the first participant is in the layout selection mode, interprets the message as a command to change the layout, in this case to layout 1407 shown as screen 803. The MCU re-mixes the video for the first participant according to the selected layout and send the video to the first participant.

While one embodiment uses a set of layouts that depend on the number of participants, another embodiment uses a fixed set of layouts independent of the number of participants.

Figure 9:
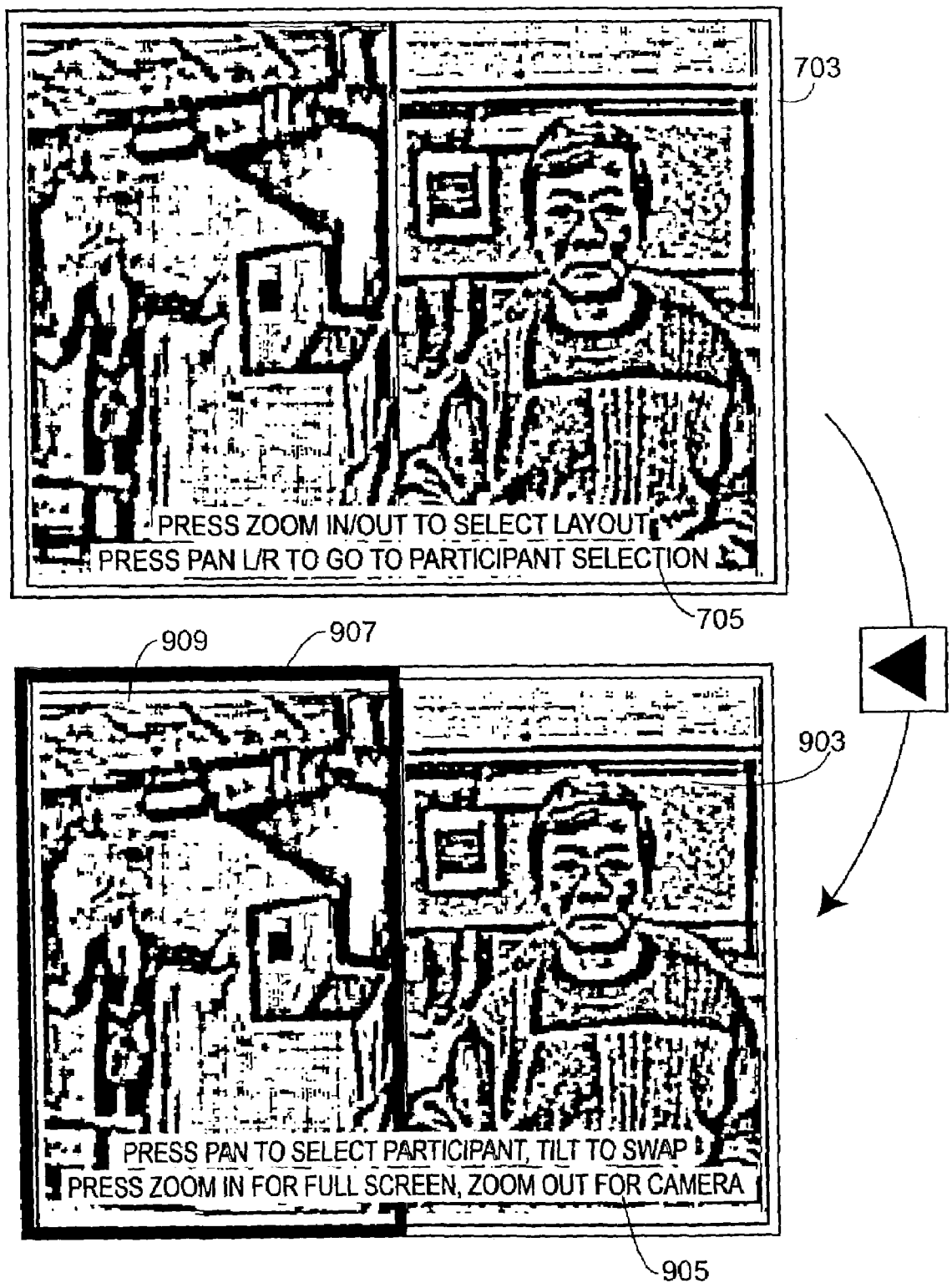
FIG. 9 shows two sample displays of a participant's screen, the first while the participant is in layout selection mode and the second while the participant is in participant selection mode according to one aspect of the invention.

As shown in FIG. 6, in one embodiment, any PAN message, e.g., PAN LEFT or PAN RIGHT, is interpreted by the MCU as an instruction to change the mode of the first participant to the participant selection mode 607. FIG. 9 shows the screen of the 2 by 1 layout in participant selection mode. When the first terminal is first transitioned to participant selection mode, a first selection of a participant is made, e.g., the left participant in a 2×1 layout and the bottom left participant in a 2×2 layout, a 1+2 layout or a 1+5 layout. Thus, in FIG. 9, as a result of the first participant sending a PAN LEFT message, the MCU selects the participant 909 and forms a display 903 which includes a frame 907 around the selected participant 909 and further generates a text massage 905 for output on the first participant's screen. In one embodiment, the message 905 instructs the user to invoke a PAN LEFT or PAN RIGHT to select a different participant, and to invoke a ZOOM OUT control to change to a participant-to-participant camera control mode 609 (FIG. 6), also called camera control mode, in which the FECC controls have their original camera control function and control the camera of the selected participant. The message also instructs the user to invoke the ZOOM IN control to change to a full-screen mode 611 (also called single participant mode) in which the selected participant is displayed in full screen and in which the FECC controls have their original camera control function and control the camera of the selected participant.

Figure 10:
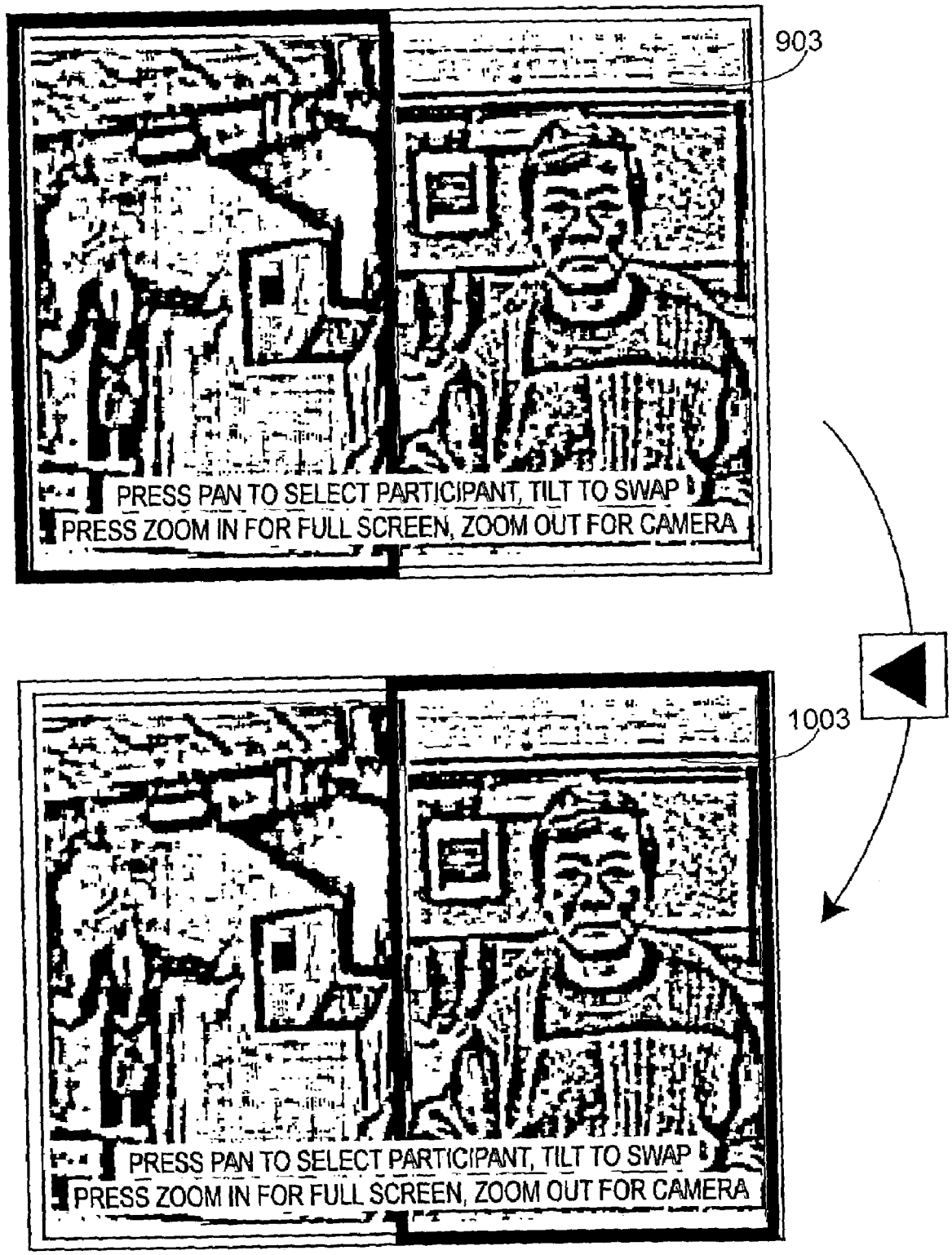
FIG. 10 shows two sample displays of a participant's screen while the participant is in participant selection mode, each showing a different selected participant, according to one aspect of the invention.
Figure 11:
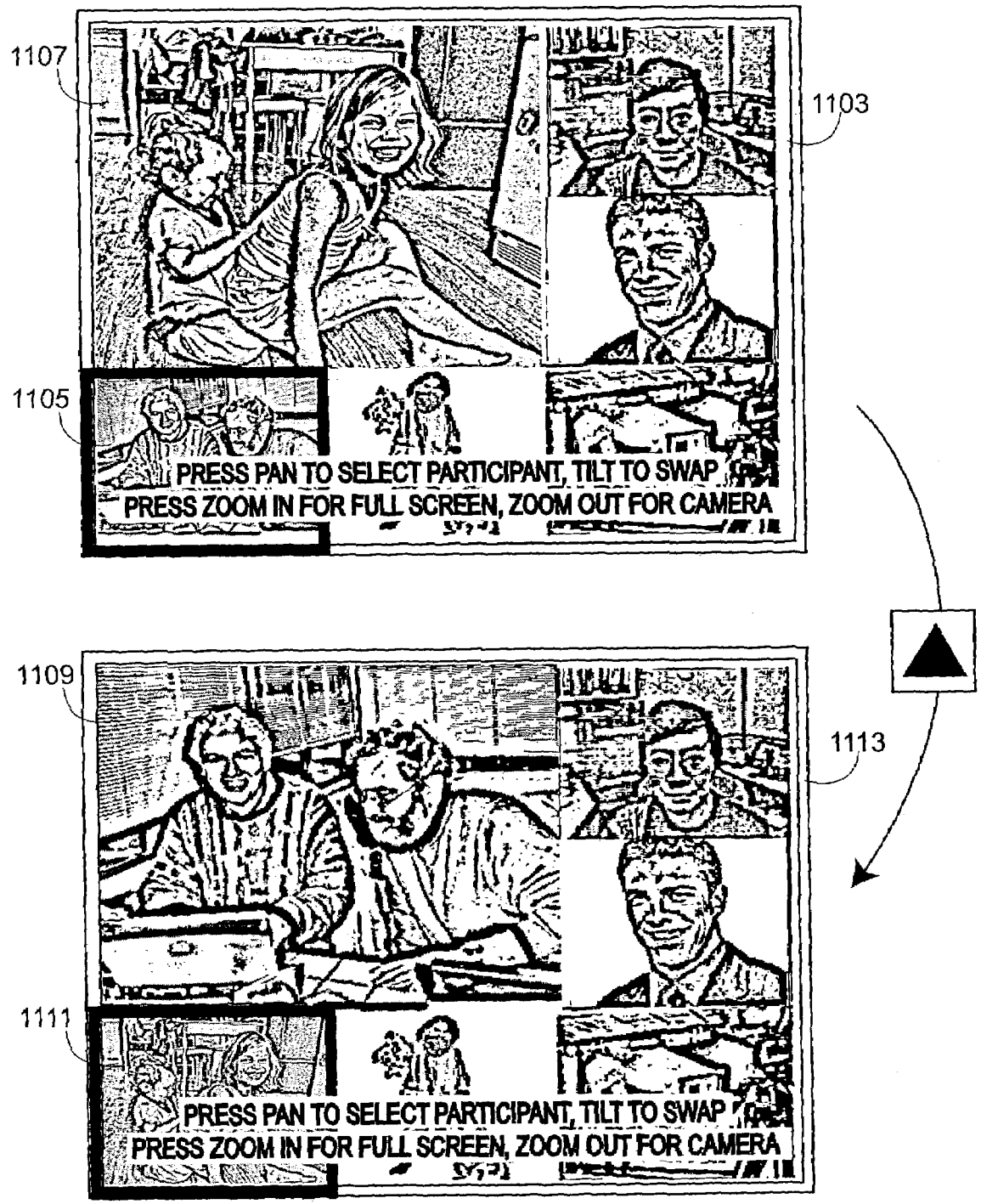
FIG. 11 shows two sample displays of a participant's screen while the participant is in participant selection mode with a layout that shows one participant more prominently that the other. The two displays are before and after invoking of a layout selection control for permuting the selected participant with the more prominently displayed participant according to one aspect of the invention.

In one embodiment, in participant selection mode, each PAN LEFT message causes the MCU to change the selected participant in a first order and each PAN RIGHT causes the MCU to changes the selected participant in an order opposite to the first order. FIG. 10 shows the display 903 and the display 1003 of the first participant after the PAN LEFT is pressed. The frame is now around the other participant.

In one embodiment, one or more of the FECC controls causes permuting the participants in the display. The permuting is particularly applicable for layouts with one participant being more prominently displayed, e.g., referring to FIG. 14, the I+5 layout 1407 and the I+2 layout 1405. In one embodiment, when the first participant is in participant selection mode, one or more of the FECC controls permutes the participants, e.g., changes the more prominently displayed participant, e.g., to become the previously selected participant. In the embodiment described by the state transition diagram of FIG. 6, the TILT controls have this effect. For example, the MCU receiving a TILT UP from the first participant when the first participant is in the participant selection mode with a 1+5 layout interprets the TILT UP as an instruction to swap the more prominently displayed participant with the selected participant. This is illustrated by example in FIG. 11 which shows the screen of the first participant in participant selection mode with a 1+5 layout 1103 with a first selected participant 1105 and a more prominently displayed participant 1107. When the user of the first terminal invokes a TILT UP control, the related FECC message is sent to the MCU via the packet network. The MCU receives and interprets the TILT UP message as a command to swap the first selected participant with the more prominently displayed participant. The MCU re-mixes the video for the first participant so that the screen layout 1113 now displays what was the selected participant as the more prominently displayed participant (shown as 1109), and the previously more prominently displayed participant as the selected participant (shown as 1111).

In one embodiment, TILT DOWN has a similar effect to TILT UP, i.e., permuting participants. However, in one embodiment, TILT DOWN and TILT UP permute the participants in different ways.

Figure 12:
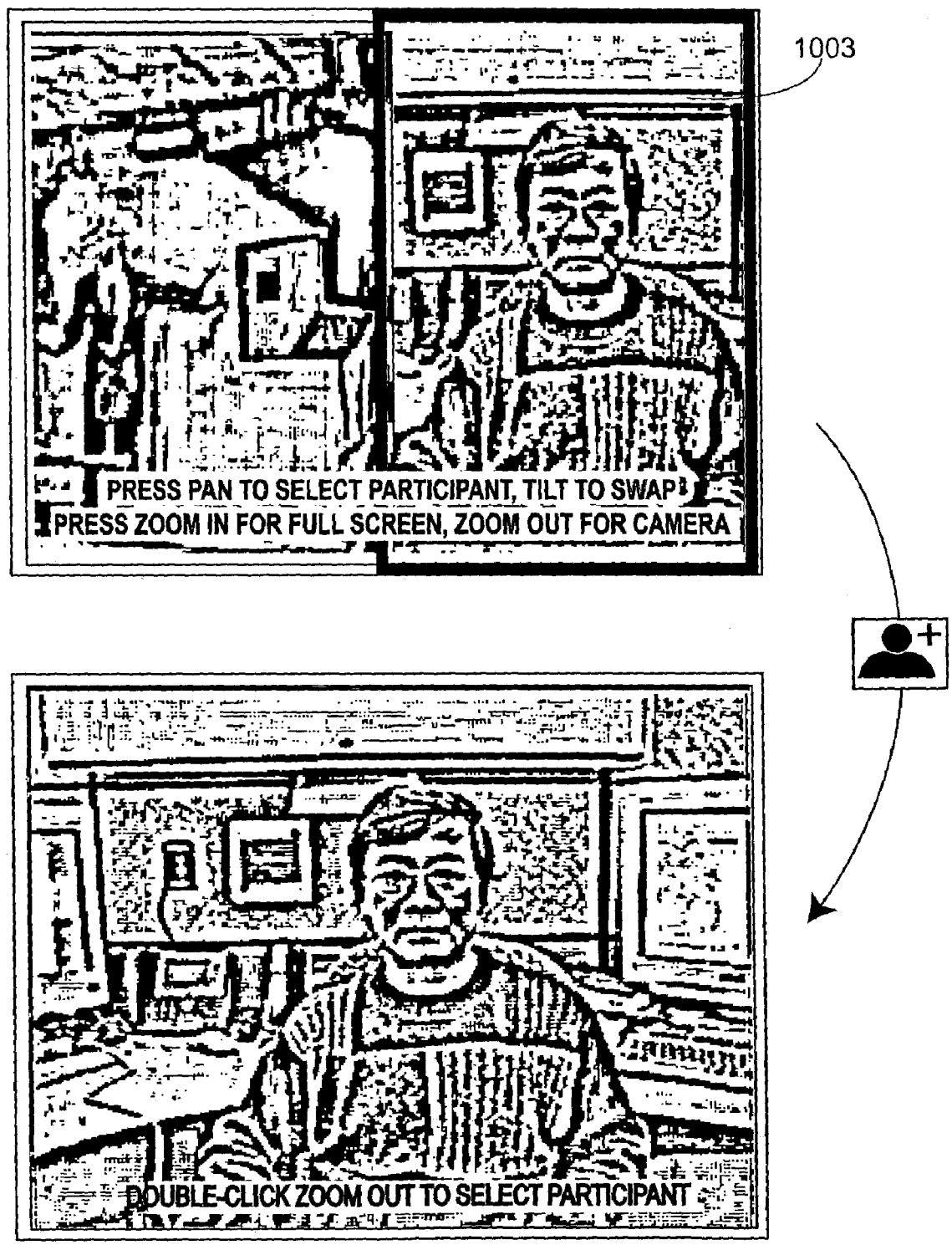
FIG. 12 shows two sample displays of a participant's screen, the first while the participant is in participant selection mode and the second while the participant is in single participant display mode according to one aspect of the invention.

FIG. 12 illustrates how when the first terminal is in participant selection mode 607, one of the FECC messages is interpreted as an instruction to change the mode to the single participant mode 611 (FIG. 6) in which the selected participant is displayed in full screen and in which the FECC controls have their original camera control function and control the camera of the selected participant. Shown is the display of the first participant in the participant selection mode 607 with the 2+1 layout 1003 and the right hand participant selected. As a result of the user of the first terminal invoking the ZOOM IN control, the first terminal sends a ZOOM IN FECC message to the MCU via the packet network. The MCU receives the FECC message and because the first participant is in the participant selection mode, selects the selected participant for full screen display on the first participant's screen. In one embodiment, the MCU passes through the video data from selected participant to the first participant with no transcoding to full screen video. In such an embodiment, the MCU includes a bitrate control method that ensures that the bitrate for the video is supported by both the first participant and the selected participant. In such an embodiment, if the first participant does not have the capability to decode the video being sent to the MCU by the selected participant, no single participant mode will be supported and a message is sent to the first participant from the MCU.

In another embodiment, transcoding or transrating is supported for single participant mode.

FIG. 12 shows the screen display 1005 of the first participant in single participant mode displaying the last selected participant as a result of the MCU receiving, interpreting, and acting on the ZOOM IN message from the first participant in participant selection mode.

When in the single participant mode, in one embodiment, the FECC controls act to control the camera of the selected participant being displayed in the full-screen. In another embodiment, the single participant mode does not activate the participant-to-participant camera control feature.

In one embodiment, when the first participant is in the single participant mode, invoking the ZOOM OUT control twice in rapid succession results in the mode of the first terminal changing back to the participant selection mode. Note in FIG. 12 that the display of the first participant includes a message explaining how to return to the participant selection mode.

FIG. 12 shows the screen display 1005 of the first participant in single participant mode displaying the last selected participant as a result of the MCU receiving, interpreting, and acting on the ZOOM IN message from the first participant in participant selection mode.

Figure 13:
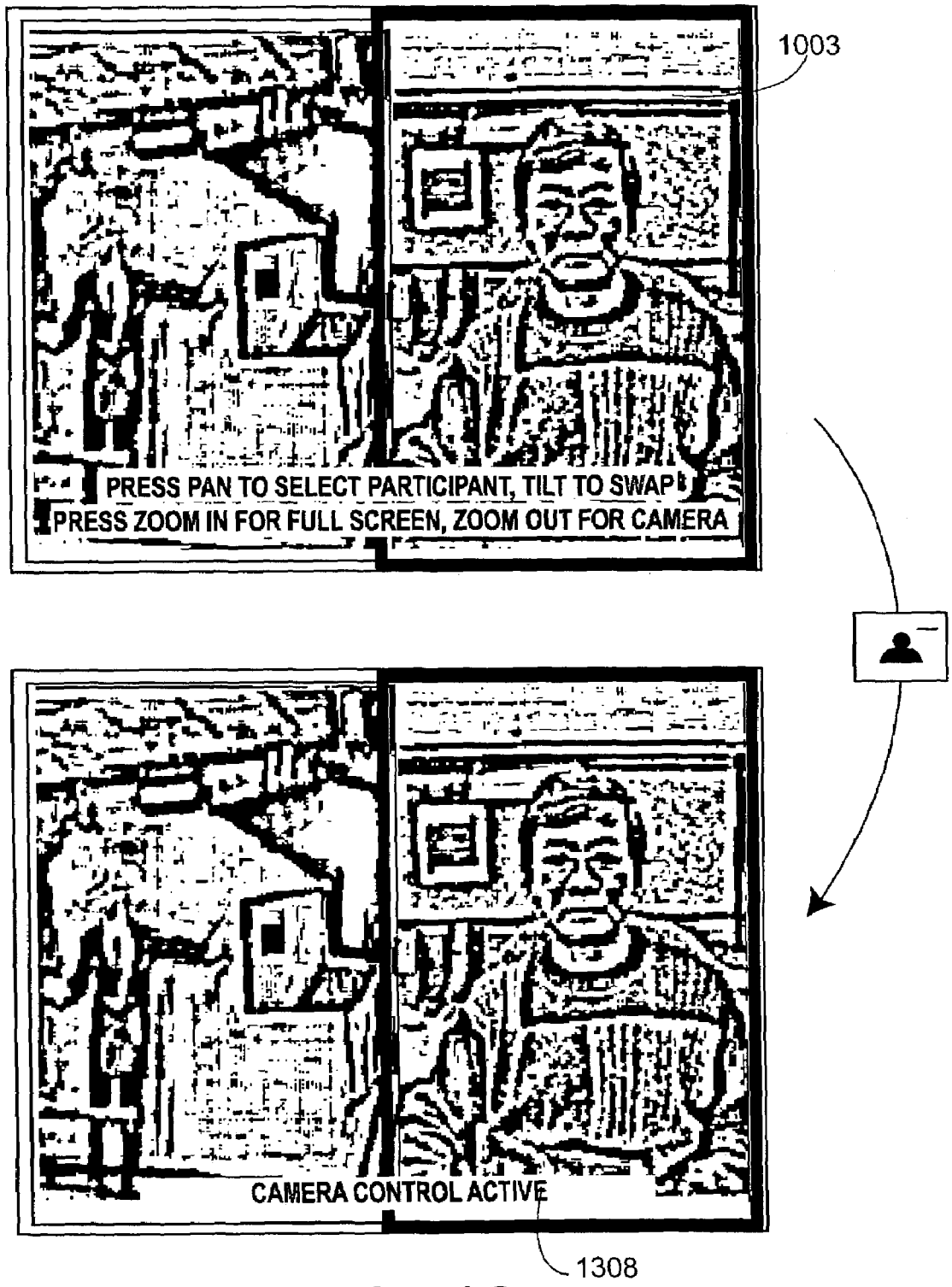
FIG. 13 shows two sample displays of a participant's screen, the first while the participant is in participant selection mode and the second while the participant is in camera control mode according to one aspect of the invention.

FIG. 13 illustrates how when the first terminal is in participant selection mode 607, one of the FECC messages is interpreted as an instruction to change the mode to the participant-to-participant camera control mode 609 (FIG. 6) in which the FECC controls have their original camera control function and control the camera of the selected participant. Shown is the display of the first participant in the participant selection mode 607 with the 2+1 layout 1003 and the right hand participant selected. As a result of the user of the first terminal invoking the ZOOM OUT control, the first terminal sends a ZOOM OUT FECC message to the MCU via the packet network. The MCU receives the FECC message and because the first participant is in the participant selection mode, changes the mode to participant-to-participant camera control. The MCU interprets future FECC messages received from the first participant as commands to control the camera of the selected participant, and sends the FECC messages on to the selected participant to command the camera to change according to the particular FECC message. In one embodiment, the MCU mixes in a message 1008 for display on the first participant's screen that indicates that camera control is active.

In one embodiment, the first participant stays in any mode other than the initial idle mode 603 no more than a preset amount of time. The MCU times the period the first participant is in any mode other than the idle mode 603. As shown in FIG. 6, when the first participant has been in any mode a preset amount of time, the MCU causes the first participant to return to the idle mode 603.

While the embodiment described in FIG. 6 has a idle mode separate from the other modes, in one alternate embodiment, the idle mode is the layout selection mode 605, and in another embodiment, the idle mode is the participant selection mode 607. How to modify the state transition diagram and the operation for such alternatives would be clear to those skilled in the art.

Note that some embodiments of the invention have fewer capabilities. For example, one alternate embodiment provides participant selection control, but no layout selection control. In another embodiment, the layout selection mode and the participant selection modes are combined into a single combined mode, with different FECC controls interpreted differently to provide both layout selection and participant selection while in the same mode. For example, according to one such alternate embodiment, the TILT control is used to select a layout, and the PAN control is used to select a participant. The ZOOM controls are the same as when in the participant selection mode 607. The swapping of the more prominently displayed participant, and other permuting functions are carried by other mechanisms, such as invoking one of FECC control in rapid succession, or by having different permutations be considered as different layouts.

Thus, in one embodiment, the participant selection mode incorporates layout selection such that invoking of one or more different FECC messages while in the participant selection mode selects a different layout from the set of layouts. Similarly, in another embodiment, the layout selection mode incorporates participant selection such that invoking of one or more different FECC messages while in the layout selection mode selects a different participant for the first terminal. How to modify the state transition diagram for such alternatives would be clear to those skilled in the art.

The embodiments described above uses the most basic FECC controls: PAN, TILT, and ZOOM. Other FECC controls also are known, and other embodiments use such other controls. Some embodiments use FECC's source camera selection control for one or more functions, depending on the mode of the first participant, i.e., the participant sending the FECC messages. One such alternate embodiment uses the source camera selection controls for participant selection. The controls are redefined by the MCU to be participant selection controls, and, for example, each of the source cameras are identified with a participant, e.g., using participant ID. When the operator of the first terminal selects a source camera, the MCU interprets the source camera selection message as an instruction to select a participant for the actually selects the participant for the MCU. With a H.224 channel, the maximum number of source cameras is 11.

Because not all terminals support source camera control, whether or not the source camera approach is used is a function of the terminal and is defined during the terminal capability negotiation phase with the MCU.

In one embodiment, the MCU is sent information participant about which camera control selects which participant. In one embodiment, this is done by the MCU assigning the terminal numbers and superimposing a number on each subimage related to a participant.

Note that the embodiment above describes having only one participant-to-participant camera control mode 609. In other embodiments, more than one camera control modes can be defined, e.g., for the first participant to use the basic FECC controls to control the microphone or other camera feature of the selected participant.

Thus has been described a method for implementing layout selection, participant selection, and participant-to-participant camera control in a centrally controlled continuous presence multipoint videoconference. An operator of a particular terminal (the first terminal) can select a desired layout from a set of layouts to display in the local terminal and can also select one of the remote participants, e.g., from the selected layout. The selected participant can also be viewed full-screen on the first terminal. The operator of the first terminal can also conduct FECC on the selected terminal. One embodiment uses only the basic features of terminal-to-terminal FECC including PAN LEFT, PAN RIGHT, TILT UP, TILT DOWN, ZOOM IN and ZOOM OUT.

Figure 4:
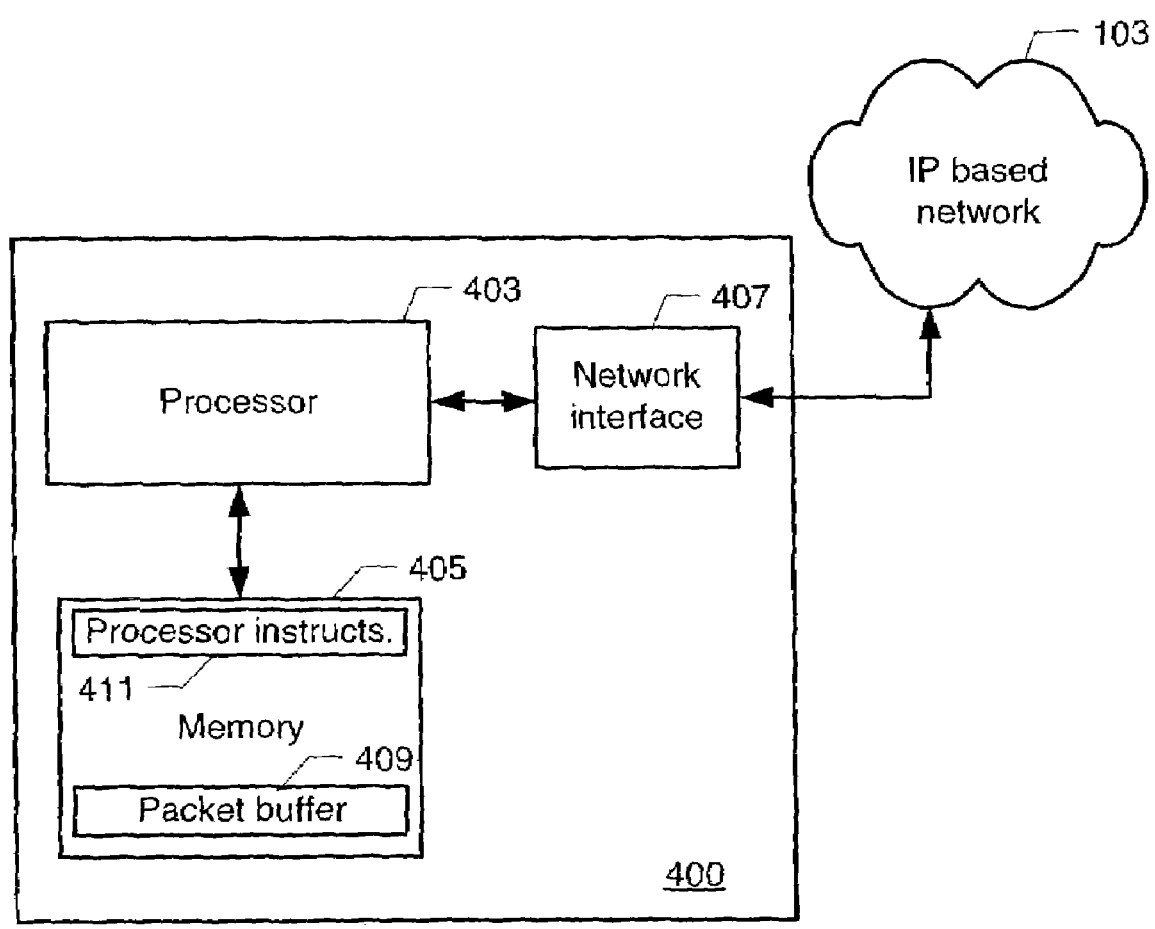
FIG. 4 shows a simplified block diagram of one embodiment of an apparatus that implements a method using FECC packets for layout selection and/or participant selection, in addition to participant-to-participant camera control.

FIG. 4 shows a simplified block diagram of one embodiment 400 of an apparatus to implementing layout selection, participant selection, and/or participant-to-participant camera control in a centrally controlled continuous presence multipoint videoconference. The apparatus 400 typically is part of an MCU. FIG. 4 leaves out a lot of the detail in order not to obscure the inventive aspects. One embodiment includes one or more processors, shown as a single processor 403 in FIG. 4, coupled via a network interface 407 to the packet-based network 103 to which the other participants are coupled. The apparatus includes a memory 409 coupled to the processor to store one or more received packets. In one embodiment, the memory 409 is a hardware buffer, and in another, it is part of main memory 405 coupled to the processor 403. The memory 405 includes a set 411 of one or more computer readable code segments that instruct the processor(s) to interpret any FECC message received from a terminal (the first terminal, the first participant) via the network 103 according to the mode of the first terminal and to carry out the layout control and/or participant selection and/or camera control according to the according to the FECC message and its interpretation for the mode of the first terminal.

Figure 5A:
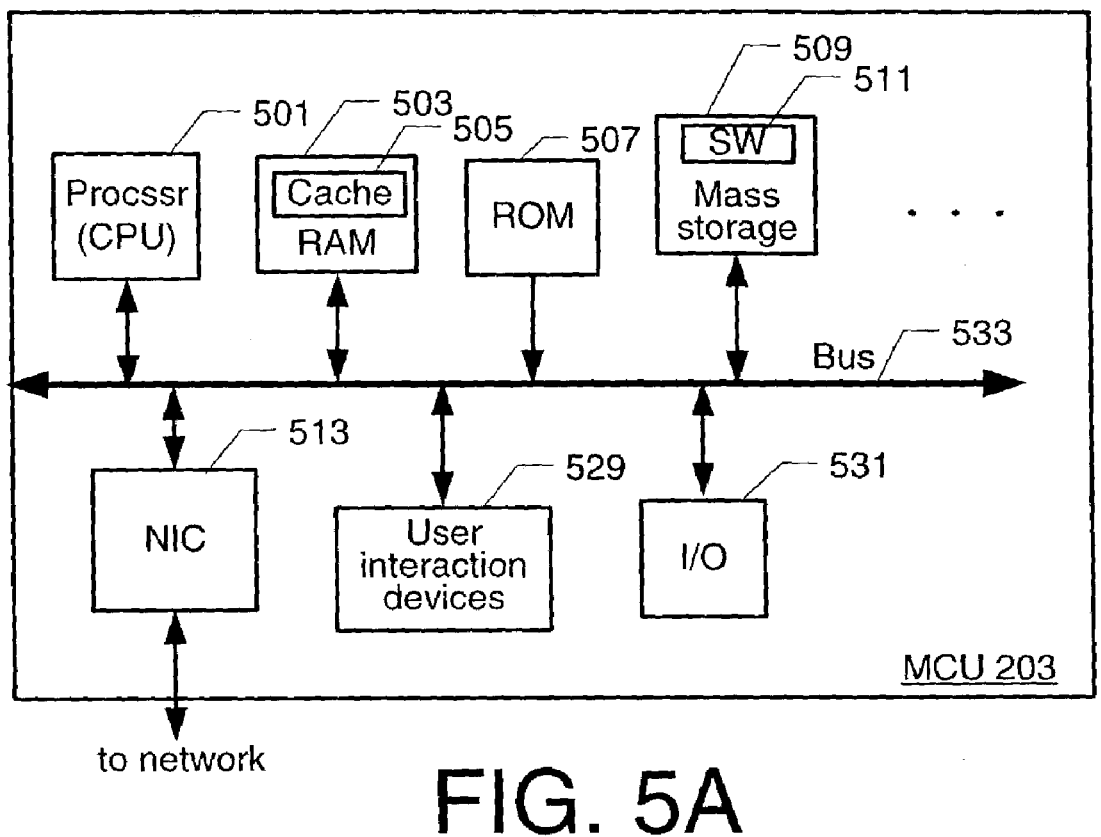
FIG. 5A shows one embodiment of a MCU that is based on a standard computer and that includes one or more aspects of the invention.

FIG. 5A shows one embodiment of a MCU, e.g., MCU 203 that is based on a standard computer. The MCU includes a central processing unit (CPU) 501, a random access memory (RAM) 503 that includes one or more cache memories 505, a mass storage device 509, a network interface device (NIC) 513 for connecting to network 103, and one or more user interaction devices 529 such as a pointing device, a keyboard, and so forth. MCU 203 may also include a display (not shown). MCU 203 may also include read only memory (ROM) 507 and other I/O devices generally shown as 531 such as a CD-read/write device, an input scanner, a printing device, and so forth. One or more busses, shown symbolically in FIG. 5A as a single bus 533 interconnect the various components. The mass storage device 809 may include a magnetic, optical, or other equivalent storage medium.

In one embodiment, the MCU functionality, as well as aspects of the invention operate as software, i.e., one or more computer readable code segments that when loaded into RAM 503 instruct one or more of the processors 501 of MCU 203 to carry out the processes that provide H.323 functionality as well as one or more aspects of the invention. The code segments are carried on a carrier medium, e.g., a magnetic medium as part of storage 509, shown herein as software 511. The code segments may initially be provided as a software product carried in optical media, e.g., a CD-ROM, or carried as signals for transmission via a network.

While the MCU 203 is shown having a single processor 501 in FIG. 5A and a single processor 403 in FIG. 4, it is to be understood that the MCU may actually have several processors, schematically shown as only one processor in FIGS. 4 and 5A. Thus, those in the art will understand that FIGS. 4 and 5 are simplified configuration. Actual implementations may include more or less components than shown.

Figure 5B:
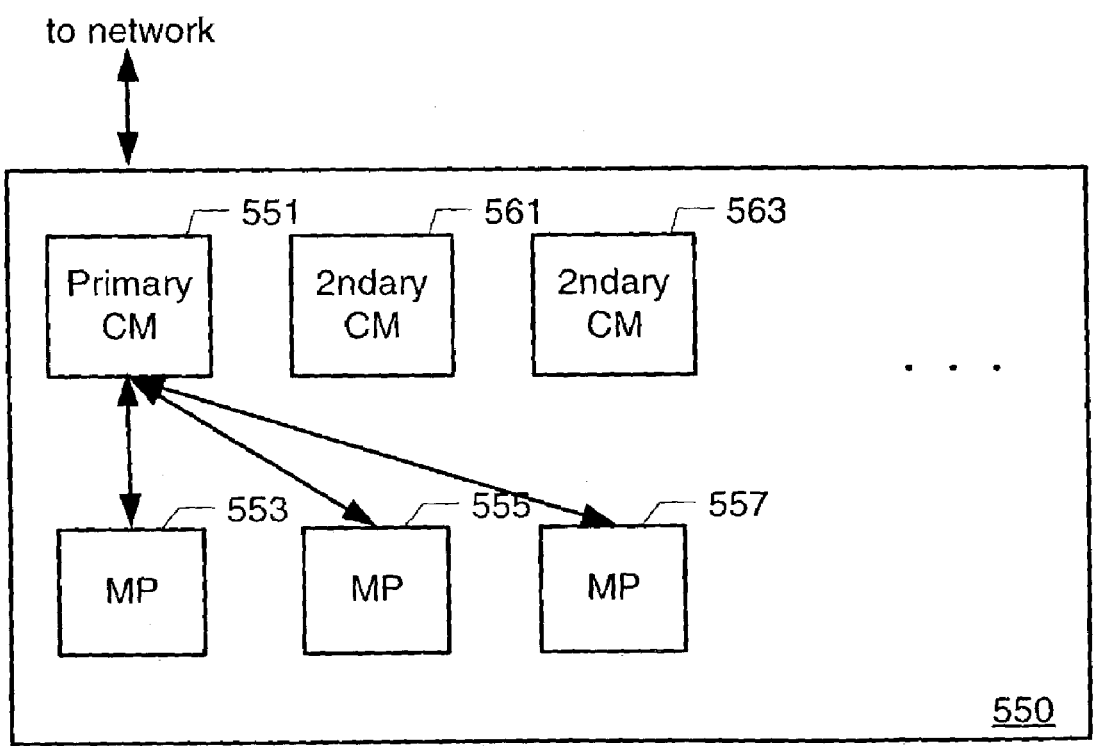
FIG. 5B shows the logical configuration of another embodiment of a MCU based on an architecture that includes one or more call managers and one or more media processors.

FIG. 5B shows in simplified form an embodiment of the invention implemented in an MCU that uses a decomposed architecture 550 in which media devices are centrally controlled by a separate call manager (CM) 551. FIG. 5B shows the logical architecture. This architecture conforms to a collection of products, designs, strategies, and protocols commonly called "Architecture for Voice, Video, and Integrated Data" or "AVVID" (Cisco Systems, Inc., San Jose, Calif.). AVVID encompasses input/output devices such as phones, cameras, videoconference terminals, servers, and so forth. It also includes operating systems, and database management systems. However, the generally accepted core of this architecture is a management control system (the CM), some network device(s) and some control and delivery protocols.

The Call Manager 551 has overall control of the terminals and of communication in a videoconference. In one embodiment, the call manager 551 carries out the functions of the MC part of a traditional MCU architecture. While in one embodiment, one any terminal is controlled by only one MC, in another embodiment one media device controlled by more than one MC, with each conference still be controlled by a single MC.

In one embodiment, there are at least two instances (installations) of Call Manager. This allows for fault tolerance. FIG. 5B shows a primary call manager and two additional call managers 561 and 563.

Coupled to the CMs are one or more signal processors (media processors) to provide for all the media processing. Three media processors 553, 555, and 557 are shown in FIG. 5B coupled to the primary CM 551.

The MCU includes protocol stacks for H.323 is used and its associated protocols including Q.931/H.225 and H.245. One embodiment also includes support for Annex Q of H.323.

In one embodiment, the CM 551 receives FECC messages from a terminal (the first terminal, the first participant) via the network. The FECC messages are passed to one or more MPs that interpret any FECC message according to the mode of the first terminal. The CM instructs one or more of the media processors 553, 555, 557 to carry out the layout control and/or participant selection and/or camera control according to the PECC message and its interpretation for the mode of the first terminal. For each videoconference the media processors receives RTP/UDP/IP media streams from the videoconference participants, processes the relevant streams and sends back to each participant one or more mixed RTP/UDP/IP streams.

In one embodiment, the MCU is implemented on a network switch platform running a network operating system. One embodiment uses the IOS operating system (Cisco Systems Inc., San Jose, Calif.) and includes a network switch/router as part of the AVVID structure. The switch/router routes packets that are data and real time applications. The switch/router also serves to route and convert packets from a packet format to another format such as for an ISDN or analog video and/or voice circuit. A gateway from a packet network environment to the either a telco digital circuit or to an analog circuit, may also be included.

In one embodiment, the CM communicates with the m one or more media processors via a packet network connection using a protocol called Skinny Client Control Protocol (SCCP) (Cisco Systems, Inc., San Jose, Calif.) that is encapsulated with TCP under the IP protocol. Alternate embodiments can use other protocols, e.g., the Session Initialization Protocol (SIP). defined by the Internet Engineering Task Force (IETF).

(I stop her for today. I will continue tomorrow.) Some embodiment of the invention are each in the form of a computer program carried on a carrier medium that includes one or more computer readable code segments that instruct one or more processors of a processing system, e.g., a one or more processors that are part of an MCU, to carry out each of the method embodiments described herein. Thus, as will be appreciated by those skilled in the art, embodiments of the present invention may be embodied as a method, an apparatus such as a special purpose apparatus, an apparatus such as a data processing system, or a carrier medium, e.g., a computer program product. The carrier medium carries one or more computer readable code segments for controlling a processing system to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code segments embodied in the medium. Any suitable computer readable medium may be used including a magnetic storage device such as a diskette or a hard disk, or an optical storage device such as a CD-ROM.

It will be understood that the steps of methods discussed are performed in one embodiment by an appropriate processor (or processors) of a processing (i.e., computer) system executing instructions (code segments) stored in storage. It will also be understood that the invention is not limited to any particular implementation or programming technique and that the invention may be implemented using any appropriate techniques for implementing the functionality described herein. The invention is not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

Similarly, it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

It should further be appreciated that although the invention has been described in the context of H.323, the invention is not limited to such contexts and may be utilized in various other applications and systems that use a packet network fro communication between a conference controller and one or more of the videoconference participants. Furthermore, the invention is not limited to any one type of network architecture and method of encapsulation, and thus may be utilized in conjunction with one or a combination of other network architectures/protocols.

Furthermore, it is to be understood that alternate modes and functionality of each FECC message within a mode, including within the modes described herein, are all possible, and such variations are meant to be covered by the invention.

For example, different embodiments may have a different set of layouts. Different embodiments may define the FECC messages differently than described herein when in any mode other than the FECC mode.

By a method for providing one or more controls of the set of controls consisting of layout selection, participant selection to select a participant, and participant-to-participant far end camera control (FECC) of the selected participant we mean for the scope to include method embodiments that provide all capabilities, method embodiments that provide layout selection only, method embodiments that provide participant selection only, method embodiments that provide a combination of participant selection with participant-to-participant camera control, and so forth.

All publications, patents, and patent applications cited herein are hereby incorporated by reference.

Thus, while there has been described what is believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

We claim:

1. In a multipoint videoconference, the videoconference having a first participant and a plurality of other participants, a method of providing one or more controls of the set of controls consisting of layout selection, participant selection to select a participant, and participant-to-participant camera control of the selected participant, the method comprising:

receiving an FECC message of a set of FECC messages over a packet network from the first participant, the first participant having a set of FEEC modes and being in one of the FECC modes of the set;

maintaining knowledge of the mode of the first participant;

interpreting the received FECC message according to the FECC mode of the first participant; and depending on the FECC mode of the first participant, the interpreted FECC message, and the set of controls being provided by the method, one of changing the FECC mode of the first participant, forming a layout for the first participant, selecting a participant for the first participant, or carrying out participant-to-participant camera control of a previously selected participant.

2. A method as recited in claim 1, wherein the set of controls includes layout selection from a set of layouts, wherein the set of modes includes a layout selection mode and at least one other mode, and wherein a first subset of one or more of the FECC messages are interpretable as an instruction to change the layout when in layout selection mode, such that, if the first participant is in the layout selection mode, the receiving and interpreting of any of the first subset of FECC messages causes changing the layout for the first participant.

3. A method as recited in claim 2, wherein the set of controls further includes participant selection, wherein the set of modes further includes a participant selection mode, wherein a second subset of the FECC messages is interpretable in layout selection mode as an instruction to change the mode to participant selection mode, wherein a third subset of the FECC messages is interpretable in participant selection mode as an instruction to change the selected participant, such that, if the first participant is in the layout selection mode, the receiving and interpreting of any of the second subset of FECC messages causes the mode of the first participant to change to participant selection mode, and such that, if the first participant is in the participant selection mode, the receiving and interpreting of any of the third subset of FECC messages causes a change of the selected participant for the participant.

4. A method as recited in claim 3, wherein the set of controls further includes participant selection, wherein the set of modes further includes a participant selection mode, wherein a second subset of the FECC messages is interpretable in layout selection mode as an instruction to change the mode to participant selection mode, wherein a third subset of the FECC messages is interpretable in participant selection mode as an instruction to change the selected participant, such that, if the first participant is in the layout selection mode, the receiving and interpreting of any of the second subset of FECC messages causes the mode of the first participant to change to participant selection mode, and such that, if the first participant is in the participant selection mode, the receiving and interpreting of any of the third subset of FECC messages causes a change of the selected participant for the participant.

5. A method as recited in claim 3, wherein the changing to the participant selection mode further includes selecting a default selected participant for the first participant.

6. A method as recited in claim 1, wherein the set of controls includes participant selection, wherein the set of modes includes a participant selection mode and at least one other mode, and wherein a first subset of one or more of the FECC messages are interpretable as an instruction to change the selected participant when in participant selection mode, such that, if the first participant is in the participant selection mode, the receiving and interpreting of any of the first subset of FECC messages causes changing the selected participant for the first participant.

7. A method as recited in claim 6, wherein one or more FECC messages are interpreted as an instruction to change the FECC mode of the first participant from a first mode to a second mode.

8. A method as recited in claim 6, wherein when the first participant is in the participant selection mode one or more FECC messages are interpreted as an instruction to permute the selected participant with one of the other participants for the display of the first participant if the first participant is in layout selection mode.

9. A method as recited in claim 8, wherein the layout being displayed to the first participant has a more prominently displayed participant, and wherein when the first participant is in the participant selection mode the permuting makes the selected participant the more prominently displayed participant.

10. A method as recited in claim 6, wherein the set of modes includes a single participant mode, and wherein when the first participant is in the participant selection mode one or more FECC messages are interpreted as an instruction to change to the single participant mode and display the selected participant in full screen.

11. A method as recited in claim 1, further comprising:
maintaining the time the first participant is in any mode other than a initial mode, and changing the state of the participant to the initial mode when the first participant remains in any state other than the initial state for more a the preset amount of time.

12. A method comprising:
providing a set of modes for a first participant of a multipoint videoconference that includes a plurality of participants other than the first participant; and
interpreting any FECC message received from the first participant over a packet network according to the mode of the first participant,
wherein the set of modes includes a participant selection mode and a participant-to-participant camera control mode, such that one or more FECC messages are interpreted as an instruction to select a participant for the first participant if the first participant is in the participant selection mode, and such that a received FECC message is interpreted as an FECC instruction to carry out control of a camera of a selected participant if the first participant is in the participant-to-participant camera control mode.

13. A method as recited in claim 12,
wherein the set of modes includes a second participant-to-participant camera control mode, and wherein the selected participant's camera has a controllable microphone, such that one or more FECC messages are interpreted as an instruction to carry out control of the camera microphone of a selected participant if the first participant is in the second participant-to-participant camera control mode.

14. A method as recited in claim 12, wherein one or more FECC messages are interpreted as an instruction to change the layout from a set of layouts if the first participant is in the participant selection mode.

15. A method as recited in claim 12, wherein the set of modes includes a layout selection mode, such that one or more FECC messages are interpreted as an instruction to select a layout from a set of layouts for the first participant if the first participant is in the layout selection mode.

16. A method as recited in claim 12, wherein one or more FECC messages are interpreted as an instruction to change the FECC mode of the first participant from a first mode to a second mode.

17. A method as recited in claim 12, wherein one or more FECC messages are interpreted as an instruction to permute the selected participant with one of the other participants for the display of the first participant if the first participant is in layout selection mode.

18. A method as recited in claim 17, wherein the layout being displayed has a more prominently displayed participant, and wherein the permuting makes the selected participant the more prominently displayed participant.

19. A method as recited in claim 12, wherein the set of modes includes a single participant mode, and wherein one or more FECC messages are interpreted as an instruction to change to the single participant mode and display the selected participant in full screen.

20. A method comprising:
providing a set of modes for a first participant of a multipoint videoconference that includes a plurality of participants other than the first participant; and
interpreting any FECC message received from the first participant according to the mode of the first participant,
wherein the set of modes includes a layout selection mode and a participant-to-participant camera control mode, such that one or more FECC messages are interpreted as an instruction to select a layout from a set of layouts for the first participant if the first participant is in layout selection mode, and such that a received FECC message is interpreted as an FECC instruction to change an aspect of a camera of a selected participant if the first participant is in the participant-to-participant camera control mode.

21. A method as recited in claim 20, wherein one or more FECC messages are interpreted as an instruction to select a participant or change the selected participant for the first participant if the first participant is in layout selection mode.

22. A method as recited in claim 21, wherein when the first participant is in the participant selection mode one or more FECC messages are interpreted as an instruction to permute the selected participant with one of the other participants for the display of the first participant if the first participant is in layout selection mode.

23. A method as recited in claim 22, wherein the layout being displayed has a more prominently displayed participant, and wherein the permuting makes the selected participant the more prominently displayed participant.

24. A method as recited in claim 20, wherein the layouts of a subset of the set of layouts each includes a display of the same number of participants but a different selected participant for the first participant,
whereby selecting the layout a mechanism to select a participant for the first participant.

25. A method as recited in claim 20, wherein one or more FECC messages are interpreted as an instruction to permute the selected participant with one of the other participants for the display of the first participant if the first participant is in layout selection mode.

26. A method as recited in claim 25, wherein the layout being displayed has a more prominently displayed participant, and wherein the permuting makes the selected participant the more prominently displayed participant.

27. In a multipoint videoconference, the videoconference having a first participant and a plurality of other participants, an apparatus to provide one or more controls of the set of controls consisting of layout selection, participant selection to select a participant, and participant-to-participant camera control of the selected participant, the apparatus comprising:
means for receiving an FECC message of a set of FECC messages over a packet network from the first participant, the first participant having a set of FEEC modes and being in one of the FECC modes of the set;
means for maintaining knowledge of the mode of the first participant;

means for interpreting the received FECC message according to the FECC mode of the first participant; and depending on the set of controls being provided by the apparatus, one of means for changing the FECC mode of the first participant, means for forming a layout for the first participant, selecting a participant for the first participant, or means for carrying out participant-to-participant camera control for a previously selected participant.

28. An apparatus as recited in claim 27, wherein the set of controls includes layout selection from a set of layouts, wherein the set of modes includes a layout selection mode and at least one other mode, and wherein a first subset of one or more of the FECC messages are interpretable as an instruction to change the layout when in layout selection mode, such that, if the first participant is in the layout selection mode, any of the first subset of FECC messages causes changing the layout for the first participant.

29. An apparatus as recited in claim 28, wherein the set of controls further includes participant selection, wherein the set of modes further includes a participant selection mode, wherein a second subset of the FECC messages is interpretable in layout selection mode as an instruction to change the mode to participant selection mode, wherein a third subset of the FECC messages is interpretable in participant selection mode as an instruction to change the selected participant, such that, if the first participant is in the layout selection mode, any of the second subset of FECC messages causes the mode of the first participant to change to participant selection mode, and such that, if the first participant is in the participant selection mode, any of the third subset of FECC messages causes a change of the selected participant for the participant.

30. An apparatus as recited in claim 27, wherein the set of controls includes participant selection, wherein the set of modes includes a participant selection mode and at least one other mode, and wherein a first subset of one or more of the FECC messages are interpretable as an instruction to change the selected participant when in participant selection mode, such that, if the first participant is in the participant selection mode, any of the first subset of FECC messages causes changing the selected participant for the first participant.

31. An apparatus comprising:
means for receiving packets from a first participant of a multipoint videoconference via a packet network, the multipoint videoconference including a plurality of participants other than the first participant, the first participant having a set of FECC modes; and
means for interpreting any FECC message received from the first participant over a packet network according to the mode of the first participant, said first participant,
wherein the set of modes includes a participant selection mode and a participant-to-participant camera control mode, such that one or more FECC messages are interpreted as an instruction to select a participant for the first participant if the first participant is in the participant selection mode, and such that a received FECC message is interpreted as an FECC instruction to carry out control of a camera of a selected participant if the first participant is in the participant-to-participant camera control mode.

32. An apparatus as recited in claim 31, wherein the means for interpreting interprets one or more FECC messages as an instruction to change the layout from a set of layouts if the first participant is in the participant selection mode.

33. An apparatus as recited in claim 31, wherein the set of modes includes a layout selection mode, and wherein the means for interpreting interprets one or more FECC messages as an instruction to select a layout from a set of layouts for the first participant if the first participant is in the layout selection mode.

34. An apparatus as recited in claim 31, wherein the means for interpreting interprets one or more FECC messages as an instruction to change the FECC mode of the first participant from a first mode to a second mode.

35. An apparatus as recited in claim 31, wherein the means for interpreting interprets one or more FECC messages as an instruction to permute the selected participant with one of the other participants for the display of the first participant if the first participant is in layout selection mode.

36. An apparatus comprising:
a network interface coupled to a packet network able to receiving packets from a first participant of a multipoint videoconference via the packet network, the multipoint videoconference including a plurality of participants other than the first participant, the first participant having a set of FECC modes; and
a processor to interpret any FECC message in one or more packets received from the first participant over a packet network according to the mode of the first participant, said first participant,
wherein the set of modes includes a participant selection mode and a participant-to-participant camera control mode, such that one or more FECC messages interpreted by the processor cause the processor to select a participant for the first participant if the first participant is in the participant selection mode, and such that an FECC message is interpreted by the processor as an FECC instruction to carry out control of a camera of a selected participant if the first participant is in the participant-to-participant camera control mode.

37. An apparatus as recited in claim 36, wherein one or more FECC messages interpreted by the processor cause the processor to change the layout from a set of layouts if the first participant is in the participant selection mode.

38. An apparatus as recited in claim 36, wherein the set of modes includes a layout selection mode, and wherein one or more FECC messages interpreted by the processor cause the processor to select a layout from a set of layouts for the first participant if the first participant is in the layout selection mode.

39. An apparatus as recited in claim 36, wherein one or more FECC messages interpreted by the processor cause the processor to change the FECC mode of the first participant from a first mode to a second mode.

40. An apparatus as recited in claim 36, wherein one or more FECC messages interpreted by the processor cause the processor to permute the selected participant with one of the other participants for the display of the first participant if the first participant is in layout selection mode.

41. A carrier medium carrying one or more computer readable code segments that instruct one or more processors of a processing system to carry out a method, the method comprising:
providing a set of modes for a first participant of a multipoint videoconference that includes a plurality of participants other than the first participant; and
interpreting any FECC message received from the first participant over a packet network according to the mode of the first participant,
wherein the set of modes includes a participant selection mode and a participant-to-participant camera control mode, such that one or more FECC messages are interpreted as an instruction to select a participant for the first participant if the first participant is in the participant selection mode, and such that a received FECC message is interpreted as an FECC instruction to carry out control of a camera of a selected participant if the first participant is in the participant-to-participant camera control mode.

42. A carrier medium as recited in claim 41, wherein one or more FECC messages are interpreted as an instruction to change the layout from a set of layouts if the first participant is in the participant selection mode.

43. A carrier medium as recited in claim 41, wherein the set of modes includes a layout selection mode, such that one or more FECC messages are interpreted as an instruction to select a layout from a set of layouts for the first participant if the first participant is in the layout selection mode.

44. A carrier medium as recited in claim 41, wherein one or more FECC messages are interpreted as an instruction to change the FECC mode of the first participant from a first mode to a second mode.

45. A carrier medium as recited in claim 41, wherein one or more FECC messages are interpreted as an instruction to permute the selected participant with one of the other participants for the display of the first participant if the first participant is in layout selection mode.

46. A carrier medium as recited in claim 45, wherein the layout being displayed has a more prominently displayed participant, and wherein the permuting makes the selected participant the more prominently displayed participant.

47. A carrier medium as recited in claim 41, wherein the set of modes includes a single participant mode, and wherein one or more FECC messages are interpreted as an instruction to change to the single participant mode and display the selected participant in full screen.

* * * * *

UNITED STATES PATENT AND TRADEMARK OFFICE
CERTIFICATE OF CORRECTION

PATENT NO. : 7,321,384 B1  Page 1 of 1
APPLICATION NO. : 10/453341
DATED : January 22, 2008
INVENTOR(S) : Wu et al.

It is certified that error appears in the above-identified patent and that said Letters Patent is hereby corrected as shown below:

In column 11, line 4, kindly change "I+2" to --1+2--.

In column 11, line 34 (first instance), kindly change "I+5" to --1+5--.

In column 11, line 34 (second instance), kindly change "I+2" to --1+2--.

In column 15, line 56, kindly change "PECC" to --FECC--.

Signed and Sealed this

Twentieth Day of May, 2008

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,321,384 B1 | Page 1 of 1 |
| APPLICATION NO. | : 10/453341 | |
| DATED | : January 22, 2008 | |
| INVENTOR(S) | : Wu et al. | |

It is certified that error appears in the above-identified patent and that said Letters Patent is hereby corrected as shown below:

In Column 16, line 14, kindly delete "(I stop her for today. I will continue tomorrow.)".

Signed and Sealed this

Thirteenth Day of September, 2011

David J. Kappos
*Director of the United States Patent and Trademark Office*